(12) United States Patent
Ramnani et al.

(10) Patent No.: US 11,093,307 B2
(45) Date of Patent: Aug. 17, 2021

(54) PLATFORM FOR SUPPORTING MULTIPLE VIRTUAL AGENT APPLICATIONS

(71) Applicant: Accenture Global Solutions Limited, Dublin (IE)

(72) Inventors: Roshni Ramesh Ramnani, Bangalore (IN); Harshawardhan Madhukar Wabgaonkar, Mumbai (IN); Shubhashis Sengupta, Bangalore (IN); Sanjay Podder, Thane (IN); Neville Dubash, Mumbai (IN); Tirupal Rao Ravilla, Chittoor (IN); Sumitraj Ganapat Patil, Belgaum (IN); Rakesh Thimmaiah, Bangalore (IN); Priyavanshi Pathania, Chandigarh (IN); Reeja Jose, Bangalore (IN); Chaitra Hareesh, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 206 days.

(21) Appl. No.: 15/487,061

(22) Filed: Apr. 13, 2017

(65) Prior Publication Data

US 2018/0165379 A1 Jun. 14, 2018

(30) Foreign Application Priority Data

Dec. 8, 2016 (IN) .............................. 201641042031

(51) Int. Cl.
*G06F 9/54* (2006.01)
*G06N 20/00* (2019.01)
*G06F 16/9032* (2019.01)
*G06N 20/10* (2019.01)
*G06N 3/00* (2006.01)

(52) U.S. Cl.
CPC ........ *G06F 9/543* (2013.01); *G06F 16/90332* (2019.01); *G06N 3/006* (2013.01); *G06N 20/00* (2019.01); *G06N 20/10* (2019.01)

(58) Field of Classification Search
CPC .......................... G06N 20/00; G06F 16/90332
See application file for complete search history.

(56) References Cited

U.S. PATENT DOCUMENTS

| | | | |
|---|---|---|---|
| 6,415,396 B1 * | 7/2002 | Singh ................. | G06F 11/3688 714/25 |
| 7,506,312 B1 * | 3/2009 | Girolami-Rose ......... | G06F 8/71 717/101 |
| 2009/0132520 A1 * | 5/2009 | Nemeth ................. | G06F 16/48 |

(Continued)

*Primary Examiner* — Hosain T Alam
*Assistant Examiner* — Anthony G Gemignani
(74) *Attorney, Agent, or Firm* — Harrity & Harrity, LLP

(57) ABSTRACT

A device may receive first information that identifies an input associated with a virtual agent application executing on a user device. The virtual agent application may provide an interface for a project involving a plurality of user devices. The device may determine, based on the first information that identifies the input, a first response based on second information. The device may determine, based on at least one of the first information that identifies the input or the first response and without user input, a second response. The device may provide, to the virtual agent application of the user device, fourth information that identifies at least one of the first response or the second response.

20 Claims, 16 Drawing Sheets

(56) References Cited

U.S. PATENT DOCUMENTS

| | | | |
|---|---|---|---|
| 2012/0209751 A1* | 8/2012 | Chen | G06Q 30/06 |
| | | | 705/27.2 |
| 2013/0204833 A1* | 8/2013 | Pang | G06F 16/335 |
| | | | 706/52 |
| 2014/0164508 A1* | 6/2014 | Lynch | H04L 29/08081 |
| | | | 709/204 |
| 2014/0325480 A1* | 10/2014 | Bhagavatula | G06F 11/3688 |
| | | | 717/124 |
| 2015/0088795 A1* | 3/2015 | Golovashkin | G06N 3/08 |
| | | | 706/21 |
| 2015/0187024 A1* | 7/2015 | Karatzoglou | G06Q 50/01 |
| | | | 705/319 |
| 2016/0076087 A1* | 3/2016 | Fehr | C12Q 1/6809 |
| | | | 506/9 |
| 2016/0154887 A1* | 6/2016 | Zhao | G06F 16/435 |
| | | | 707/727 |
| 2016/0239919 A1* | 8/2016 | Eder | G06Q 10/067 |
| 2018/0096283 A1 | 4/2018 | Wang et al. | |

* cited by examiner

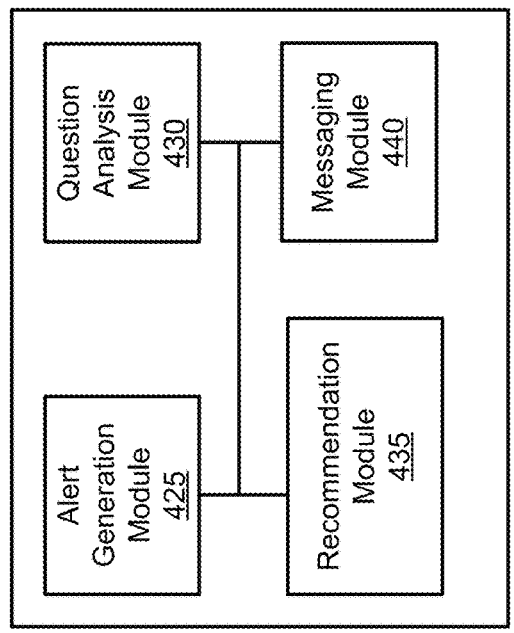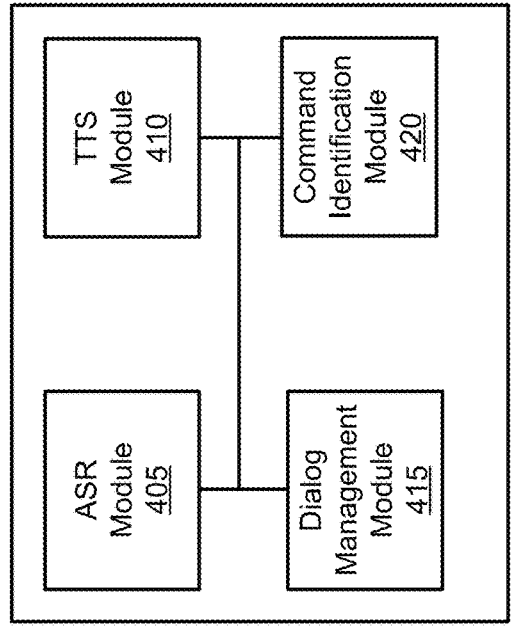
FIG. 4

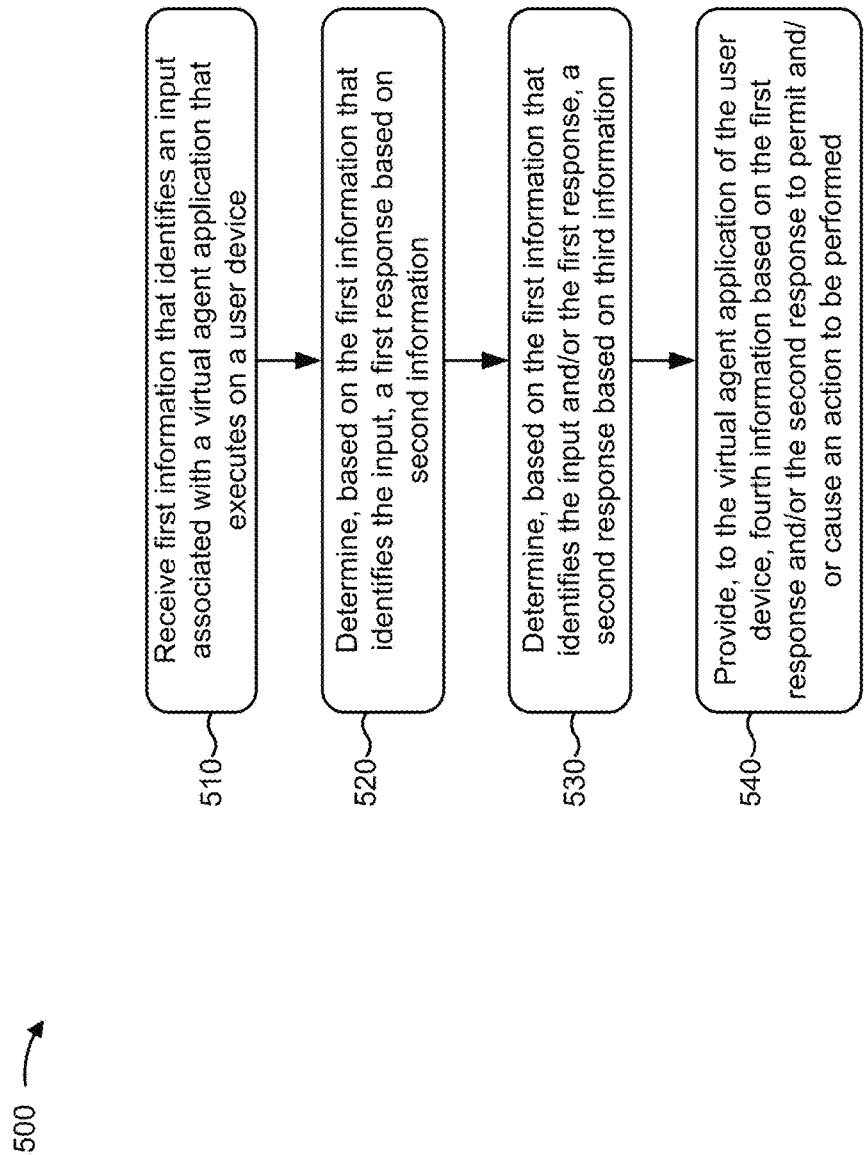

PLATFORM FOR SUPPORTING MULTIPLE VIRTUAL AGENT APPLICATIONS

RELATED APPLICATION

This application claims priority under 35 U.S.C. § 119 to Indian Patent Application No. 201641042031, filed on Dec. 8, 2016, the content of which is incorporated by reference herein in its entirety.

BACKGROUND

A user device may include applications (e.g., "virtual agents") that provide assistance to a user of the user device in performing particular actions, such as sending messages, placing calls, providing recommendations, accessing content, or the like. A virtual agent may perform the particular actions by interacting with other applications, searching information that is local to the user device (e.g., stored by the user device), and/or by delegating a request to another device (e.g., a web server).

SUMMARY

According to some possible implementations, a device may include one or more processors to receive first information that identifies an input associated with a virtual agent application executing on a user device. The virtual agent application may provide an interface for a project involving a plurality of user devices. The one or more processors may determine, based on the first information that identifies the input, a first response based on second information. The one or more processors may determine, based on at least one of the first information that identifies the input or the first response and without user input, a second response. The second response may be associated with third information, the second information may be associated with a first resource, and the third information may be associated with a second resource that is different than the first resource. The one or more processors may provide, to the virtual agent application of the user device, fourth information that identifies at least one of the first response or the second response.

According to some possible implementations, a method may include receiving, by a device, first information that identifies an input. The input may be associated with a virtual agent application of a user device. The method may include identifying, by the device and based on the input, a set of results. The method may include determining, by the device, a ranking of the set of results. The method may include providing, by the device and to the user device, second information that identifies the ranking of the set of results. The method may include receiving, by the device and based on providing the second information, third information that identifies a user-defined ranking of the set of results. The method may include performing, by the device, a technique to adjust one or more parameters associated with one or more functions based on the third information and the second information. The method may include applying, by the device, one or more values associated with the one or more parameters based on the technique. The device may determine additional rankings of additional sets of results based on applying the one or more values.

According to some possible implementations, a non-transitory computer-readable medium may store one or more instructions that, when executed by one or more processors of a device, cause the one or more processors to receive first information that identifies an input associated with a virtual agent application of a user device. The virtual agent application may provide an interface for a project involving a plurality of user devices. The one or more instructions may cause the one or more processors to determine, based on the first information that identifies the input, a first response based on second information. The one or more instructions may cause the one or more processors to determine, based on at least one of the first information that identifies the input or the first response, a second response based on third information. The one or more instructions may cause the one or more processors to provide, to the virtual agent application, fourth information based on at least one of the first response or the second response. The virtual agent application may provide, via an output component of the user device, the fourth information.

BRIEF DESCRIPTION OF THE DRAWINGS

FIG. 4 is a diagram of example functional modules of one or more devices of FIG. 2;

FIG. 5 is a flow chart of an example process for providing multiple types of responses to a virtual agent application based on an input;

DETAILED DESCRIPTION

The following detailed description of example implementations refers to the accompanying drawings. The same reference numbers in different drawings may identify the same or similar elements.

In some cases, a project (e.g., a software engineering project) may include multiple parties (e.g., developers, subject matter experts, programmers, etc.) that may each be associated with different roles and/or be associated with a different acumen. Additionally, in some cases, parties associated with the project may fluctuate. That is, existing parties may leave the project, new parties may join the project, etc. as the project evolves. Implementations described herein enable an intelligence platform and/or virtual agent applications to provide an interface between parties (e.g., users) associated with the project and information associated with the project. In this way, users may utilize virtual agent applications to receive information regarding the project, receive alerts regarding the project, determine recommendations based on information associated with the project and/or other projects, perform certain actions relating to the project, etc.

Figure 1A:
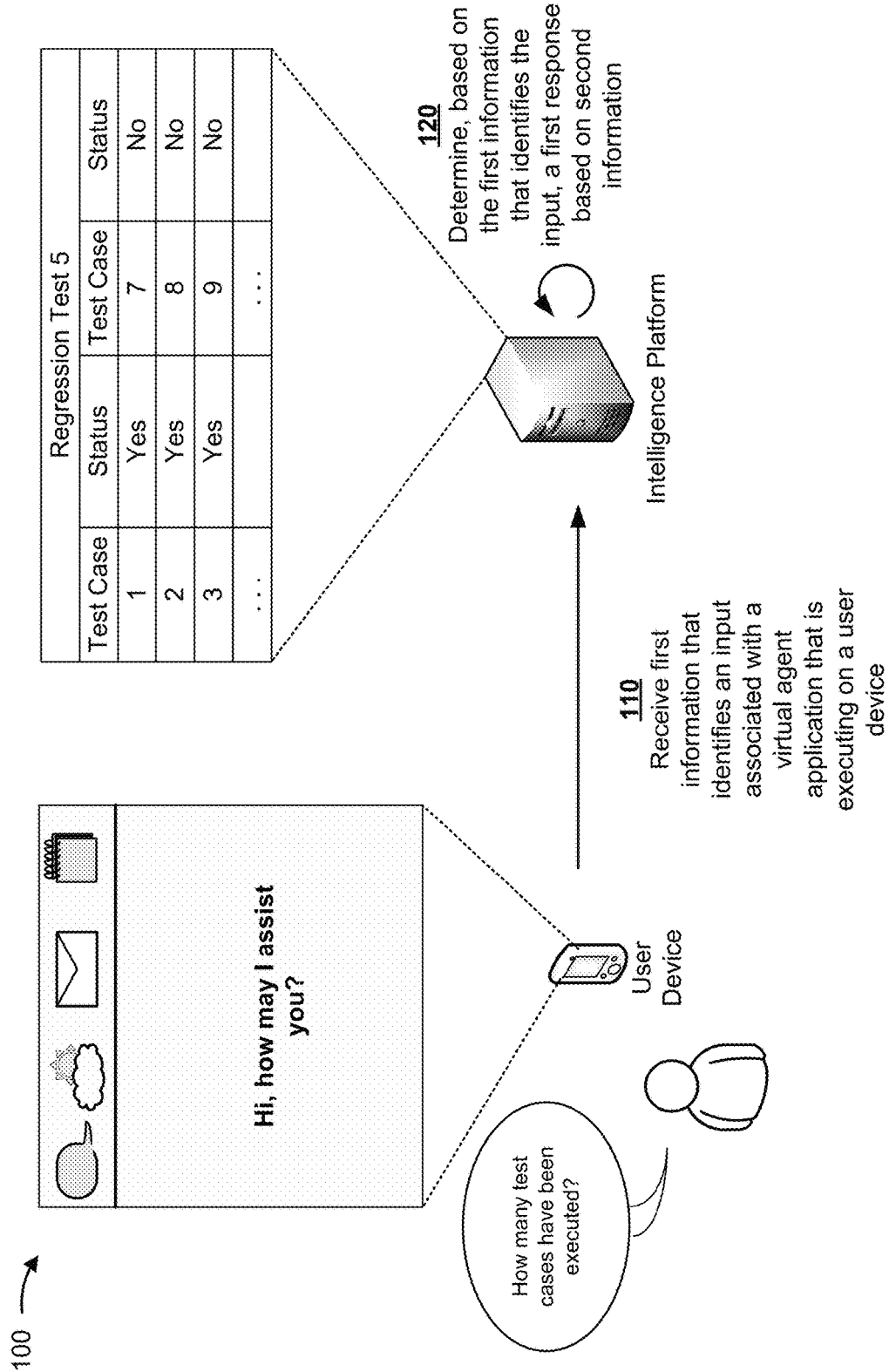
FIGS. 1A and 1B are diagrams of an overview of an example implementation described herein.
Figure 1B:
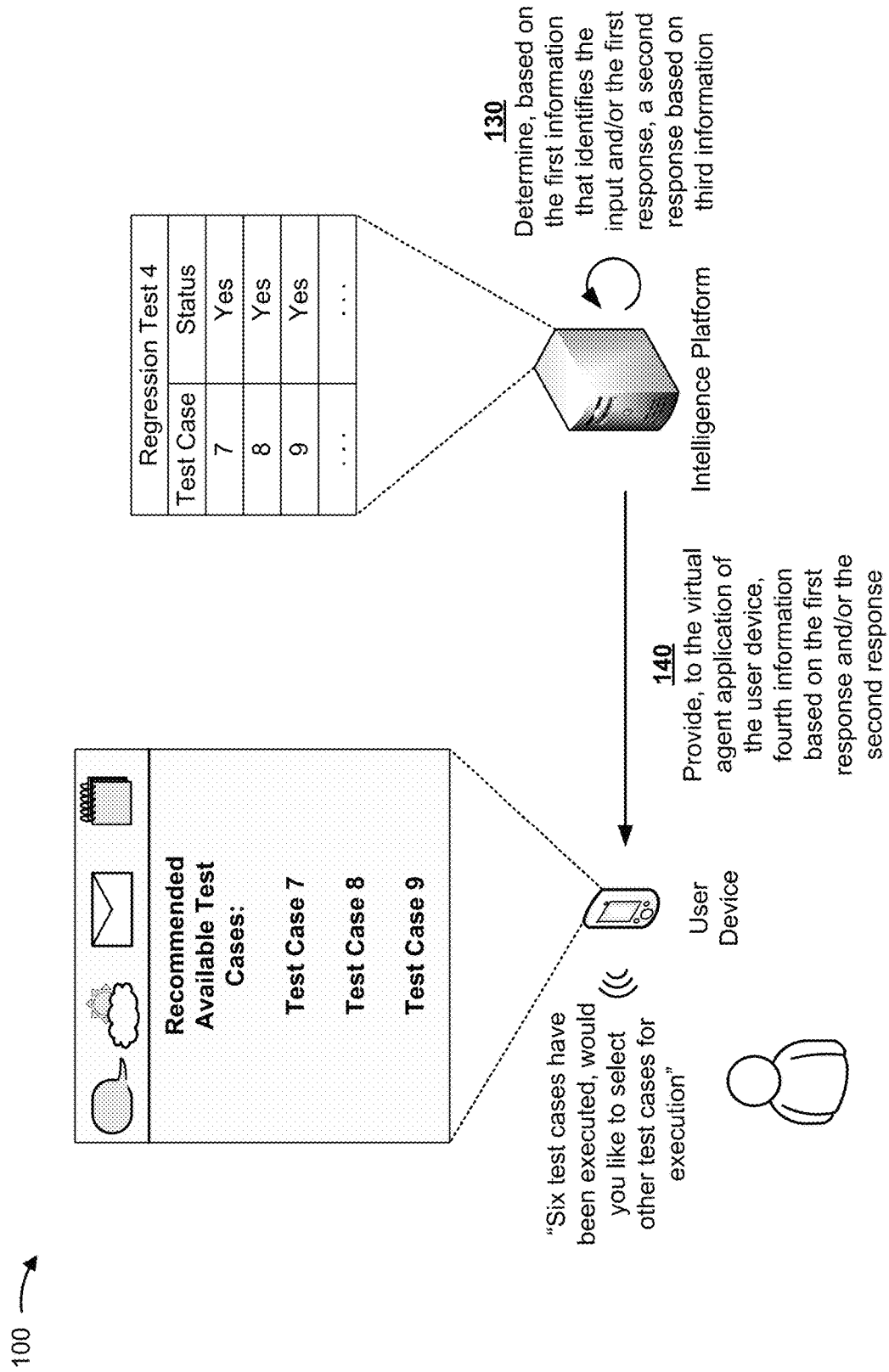

FIGS. 1A and 1B are diagrams of an overview of an example implementation 100 described herein. As shown in FIG. 1A, and by reference number 110, an intelligence platform (e.g., a cloud computing device) may receive, from a user device (e.g., a mobile phone), first information that identifies an input associated with a virtual agent application that is executing on the user device. For example, as shown, the user device may detect an utterance of the user (e.g., "How many test cases have been executed?"). In some implementations, the user device may perform automatic speech recognition (ASR) and/or may identify a context (e.g., using a dialog management technique) associated with the input. As an example, assume that a previous input identifies that the user is associated with a particular project (e.g., a software engineering project), and/or that a particular version of regression testing is taking place (e.g., a fifth iteration of regression testing). In this case, the user device may provide the first information (e.g., a query) to the intelligence platform requesting a status of the project and/or the regression test (e.g., how many test cases have been executed).

As shown by reference number 120, the intelligence platform may determine, based on the first information that identifies the input, a first response based on second information. For example, the intelligence platform may receive the first information (e.g., the query), and may identify second information (e.g., information associated with the software engineering project). For example, as shown, the intelligence platform may identify information (e.g., based on a data structure) that identifies particular test cases associated with a particular regression test iteration (e.g., "Regression Test 5") and respective statuses of the test cases (e.g., execution statuses). In some implementations, the first response may include information that is determined based on the second information (e.g., an answer to the query). As an example, assume that six test cases have been executed in association with regression test five. In this case, the first response may include information that identifies the six test cases (e.g., the answer to the query is "6").

As shown in FIG. 1B, and by reference number 130, the intelligence platform may determine, based on the first information that identifies the input and/or the first response, a second response based on third information. For example, the intelligence platform may identify other projects and/or other regression test iterations based on the first information (e.g., the query) and/or the first response (e.g., the amount of test cases that have been executed). As an example, and as shown, the intelligence platform may identify another regression test iteration (e.g., "Regression Test 4"), and may identify test cases that were executed in association with the regression test iteration (e.g., test case 7, test case 8, test case 9, etc.). Assume that the intelligence platform determined that test cases 7-9 have not been executed in association with the current regression test iteration (e.g., "Regression Test 5"). In this case, the intelligence platform may determine a second response. For example, the second response may include a recommendation, such as a recommendation that test cases 7-9 be executed (e.g., to ensure adequate test coverage, to minimize potential errors in the software, etc.).

As shown by reference number 140, the intelligence platform may provide, to the virtual agent application of the user device, fourth information based on the first response and/or the second response. For example, the user device may receive the fourth information, and may provide one or more outputs based on the fourth information. As shown, the user device (e.g., a text-to-speech module) may provide the fourth information via an output mechanism, such as a speaker. For example, the user device may provide an audible output (e.g., "Six test cases have been executed, would you like to select other test cases for execution?"). As further shown in FIG. 1B, the user device may provide, for display via a user interface, information that identifies particular test cases that may be available for execution (e.g., test cases 7-9). For example, the user device may provide the information for display based on the recommendation of the intelligence platform (e.g., that test cases 7-9 be executed). In this way, a user may interact with the virtual agent application to determine project information, receive recommendations, identify particular statuses of a project, or the like.

While implementations described herein are described in association with particular projects, domains, and/or information (e.g., related to software engineering), implementations described herein may apply to other types of projects, domains, and/or other types of information. For example, implementations described herein may be applicable to other types of virtual agent applications and/or intelligence platforms that may provide functionality in association with other types of information (e.g., weather information, financial information, sports information, business information, or the like).

Implementations described herein enable an intelligence platform to receive information that identifies an input (e.g., a user query, a user command, etc.) associated with a virtual agent application that is executing on a user device, determine one or more responses based on particular information (e.g., stored information, information associated with external information sources, etc.), and provide, to the virtual agent application of the user device, information that identifies the one or more responses.

Additionally, implementations described herein enable the intelligence platform to receive information that identifies an input (e.g., a user query), determine a particular response (e.g., a recommendation), receive information that identifies feedback (e.g., user-feedback) regarding the particular response, and implement a technique (e.g., a machine learning technique) based on the information that identifies the feedback. In this way, implementations described herein enable the intelligence platform to receive additional information (e.g., additional queries) and determine additional responses based on implementing the technique. In this way, the intelligence platform may provide, to the user device, information that more accurately matches a user preference, that is more accurate, etc. than as compared to situations where the technique was not implemented. In this way, implementations described herein may reduce an amount of additional requests (e.g., requests for other information, updated information, etc.) received by the user device and/or provided to the intelligence platform, thereby conserving processor and/or memory resources of the user device and/or the intelligence platform, and/or conserving network resources.

As indicated above, FIGS. 1A and 1B are provided merely as an example. Other examples are possible and may differ from what was described with regard to FIGS. 1A and 1B.

Figure 2:
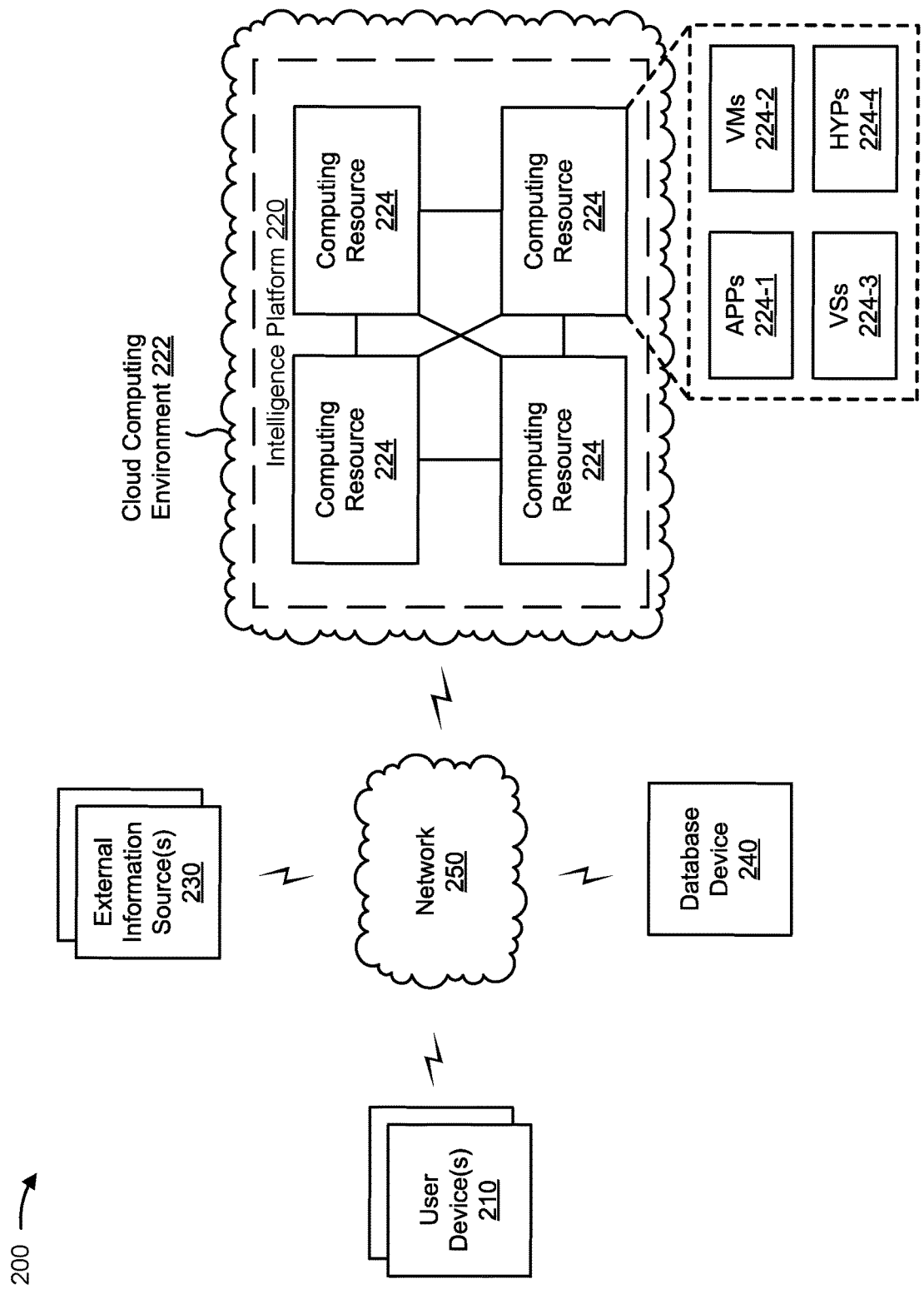
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210 (hereinafter referred to collectively as "user devices 210," and individually as "user device 210"), an intelligence platform 220, one or more external information sources 230 (hereinafter referred to collectively as "external information sources 230," and individually as "external information source 230"), a database device 240, and a network 250. Devices of environment 200 may interconnect via wired connections, wireless connections, or a combination of wired and wireless connections.

User device 210 includes one or more devices capable of receiving, generating, storing, processing, and/or providing information associated with intelligence platform 220. For example, user device 210 may include a computing device, such as a desktop computer, a laptop computer, a tablet computer, a handheld computer, a server device, a mobile phone (e.g., a smart phone or a radiotelephone), a wearable communication device (e.g., a smart wristwatch, an activity band, or a pair of smart eyeglasses), a gaming device, or a similar type of device.

Intelligence platform 220 includes one or more devices capable of receiving information that identifies an input associated with a virtual agent application of user device 210, determining multiple types of responses based on the input, and providing, to user device 210, a response based on the multiple types of responses, as described elsewhere herein. In some implementations, intelligence platform 220 may be designed to be modular such that certain software components can be swapped in or out depending on a particular need. As such, intelligence platform 220 may be easily and/or quickly reconfigured for different uses.

In some implementations, as shown, intelligence platform 220 may be hosted in cloud computing environment 222. Notably, while implementations described herein describe intelligence platform 220 as being hosted in cloud computing environment 222, in some implementations, intelligence platform 220 may not be cloud-based (i.e., may be implemented outside of a cloud computing environment) or may be partially cloud-based.

Cloud computing environment 222 includes an environment that hosts intelligence platform 220. Cloud computing environment 222 may provide computation, software, data access, storage, etc. services that do not require end-user (e.g., user device 210) knowledge of a physical location and configuration of system(s) and/or device(s) that hosts intelligence platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host intelligence platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with intelligence platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210, and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

External information source 230 includes one or more devices, accessible through network 250, that are sources of information that may be used by intelligence platform 220. For example, external information source 230 may include a server that includes particular information for use by intelligence platform 220 and/or user device 210. For example, external information source 230 may include a server or a group of servers (e.g., a cloud-based server, an application device, a content server, a host server, a web server, a database server, etc.), a desktop computer, or a similar device.

Database device 240 includes one or more devices capable of receiving, storing, and/or providing information for use by intelligence platform 220. For example, database device 240 may include a server or a group of servers. In some implementations, database device 240 may provide, to intelligence platform 220, information and/or resources.

Network 250 may include one or more wired and/or wireless networks. For example, network 250 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
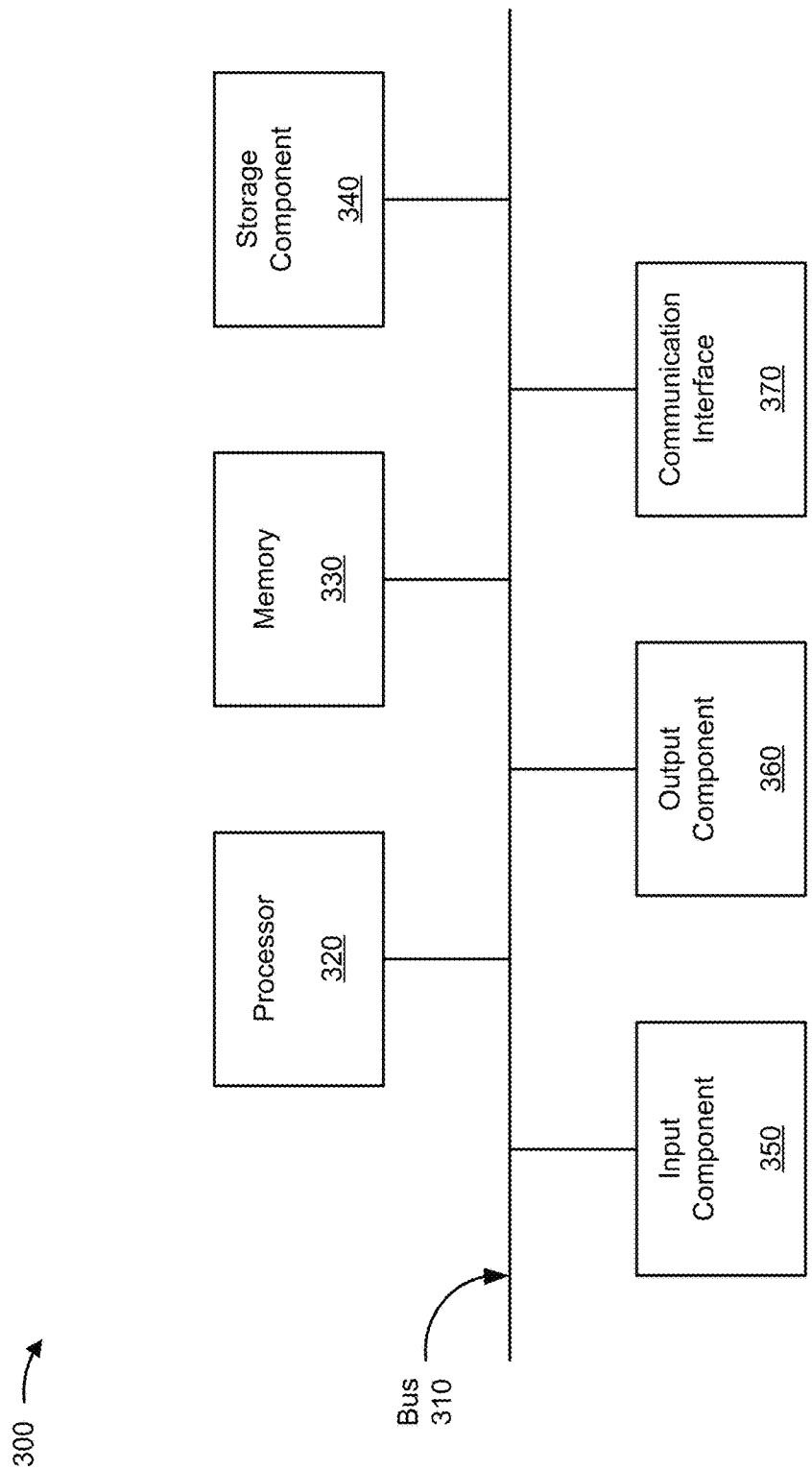
FIG. 3 is a diagram of example components of one or more devices of FIG. 2.

FIG. 3 is a diagram of example components of a device 300. Device 300 may correspond to user device 210, intelligence platform 220, external information source 230, and/or database device 240. In some implementations, user device 210, intelligence platform 220, external information source 230, and/or database device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a diagram of example functional modules of one or more devices 400. Devices 400 may correspond to user device 210 and/or intelligence platform 220. In some implementations, user device 210 and/or intelligence platform 220 may include one or more devices 400 and/or one or more functional modules of device 400. As shown in FIG. 4, devices 400 may include an automatic speech recognition (ASR) module 405, a text-to-speech (TTS) module 410, a dialog management module 415, a command identification module 420, an alert generation module 425, a question analysis module 430, a recommendation module 435, and/or a messaging module 440. In some implementations, ASR module 405, TTS module 410, dialog management module 415, and/or command identification module 435 may be implemented within user device 210. Additionally, alert generation module 425, question analysis module 430, recommendation module 435, and/or messaging module 440 may be implemented within intelligence platform 220.

ASR module 405 includes a module that receives an input (e.g., an audio input received via input component 350, such as a microphone) and provides information to an application based on the input. In some implementations, ASR module 405 may identify speech (e.g., a conversation) using one or more models (e.g., natural language understanding (NLU) models, vocabulary models, grammar models, context models, etc.), and may infer an intent of the conversation based on the one or more models. Additionally, or alternatively, ASR module 405 may receive information (e.g., training data) associated with a particular domain (e.g., software engineering), and may implement a technique (e.g., a machine learning technique) to generate the one or more models. In this way, ASR module 405 may receive information that identifies speech (e.g., an utterance of a user), may identify particular terms (e.g., related to a particular domain, such as software engineering), and may infer an intent and/or determine context of the speech based on one or more models (e.g., models that were trained using domain-specific terms, etc.).

TTS module 410 includes a module that may receive information (e.g., text information) and may generate an audio output (e.g., speech to be output via output component 360, or the like). In some implementations, TTS module 410 may implement one or more models (e.g., natural language generation (NLG) models, etc.) when generating audio output.

Dialog management module 415 includes a module that manages a state of a dialog between a device (e.g., user device 210) and a user. In some implementations, dialog management module 415 may receive one or more inputs via ASR module 405, may maintain state variables based on the one or more inputs (e.g., dialog history, such as conversation history, etc.), may perform grounding, or the like. In some implementations, dialog management module 415 may determine a context of dialog (e.g., conversation), may prompt the user for additional information (e.g., may generate an output to be provided to the user), may determine dialog intent, and/or may provide information to other devices and/or modules.

Command identification module 420 includes a module that receives information identifying an input (e.g., a user command, such as a command to access a particular application), and provides particular information, for display, based on the information identifying the input. For example, command identification module 420 may identify a particular application (e.g., a web-application, or the like), and may cause a device (e.g., user device 210) to provide information for display (e.g., cause a web-browsing application of user device 210 to access a particular web-application, or the like).

Alert generation module 425 includes a module that may analyze information (e.g., parameters associated with project information, as described elsewhere herein), may determine that a parameter associated with the information satisfies a threshold, and may determine a response (e.g., an alert) that identifies that the parameter satisfied the threshold.

Question analysis module 430 includes a module that may receive information identifying an input (e.g., a query), may determine a response (e.g., an answer), and may provide information that identifies the response (e.g., the answer). In some implementations, question analysis module 430 may determine a response based on analyzing stored information, based on requesting particular information from an information source (e.g., external information source 230, database device 240, or the like), based on implementing a technique (e.g., a machine learning technique, or the like), based on information received via one or more virtual agent applications executing on one or more user devices 210, or the like.

Recommendation module 435 includes a module that may analyze information (e.g., stored information, etc.), and may determine a response (e.g., a recommendation) based on analyzing the information. In some implementations, recommendation module 435 may determine a recommendation based on stored information, based on a model, or the like.

Messaging module 440 includes a module that may receive information that identifies an input associated with a virtual agent application (e.g., a query, a command, feedback, a prompt, etc.), may provide the information to one or more modules, may receive responses from one or more modules, and/or may provide, to the virtual agent application, information that identifies the responses.

In some implementations, one or more modules of FIG. 4 may use machine learning techniques to analyze data (e.g., training data, such as historical data, etc.) and create models. The machine learning techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like.

In some implementations, one or more modules of FIG. 4 may use another kind of computer-implemented technique, such as artificial intelligence, machine perception, or computer vision, to analyze data and determine responses. In some implementations, one or more modules may create a model using information associated with a first project and/or a first virtual agent application, and may use the model in association with a second project and/or a second virtual agent application.

In some implementations, one or more modules of FIG. 4 may receive information that identifies user feedback, and may implement a technique (e.g., to train a model). In this way, the one or more modules may receive additional information, and may use the model to determine particular responses (e.g., recommendations, answers, etc.).

The number and arrangement of functional modules shown in FIG. 4 are provided as an example. In practice, devices 400 may include additional functional modules, fewer functional modules, different functional modules, or differently arranged functional modules than those shown in FIG. 4. Additionally, or alternatively, a set of functional modules (e.g., one or more functional modules) of devices 400 may perform one or more functions described as being performed by another set of functional modules of devices 400.

FIG. 5 is a flow chart of an example process 500 for providing multiple types of responses to a virtual agent application based on an input. In some implementations, one or more process blocks of FIG. 5 may be performed by intelligence platform 220. In some implementations, one or more process blocks of FIG. 5 may be performed by another device or a group of devices separate from or including intelligence platform 220, such as user device 210, external information source 230, and/or database device 240.

As shown in FIG. 5, process 500 may include receiving first information that identifies an input associated with a virtual agent application that executes on a user device (block 510). For example, intelligence platform 220 may receive information that identifies an input associated with a virtual agent application that may be executing on user device 210.

In some implementations, user device 210 may receive information that identifies an input (e.g., a user input). For example, user device 210 may receive an input, such as an utterance by the user, text input by the user, etc., and process the input (e.g., via ASR module 405, dialog management module 415, and/or the like). In some implementations, the input may include a query, a command, a request for a recommendation, a request to access a service (e.g., a web-service, or the like), a request to initiate another application, or the like. Additionally, or alternatively, user device 210 (e.g., dialog management module 415) may provide a request (e.g., to be displayed via a user interface, and/or output via an audio output component) for additional information (e.g., during instances where additional context may be required).

In some implementations, user device 210 may determine whether the input may be managed by user device 210 (e.g., whether user device 210 may perform a particular action without forwarding information that identifies the input to intelligence platform 220). For example, if the input is a query, then user device 210 may analyze stored information (e.g., cached information) and determine whether a response may be generated based on the stored information. In this way, implementations described herein may conserve processor and/or memory resources of intelligence platform 220 (e.g., by reducing an amount of information provided to and/or requested from intelligence platform 220). Additionally, or alternatively, user device 210 may determine that the information that identifies the input may be forwarded to intelligence platform 220 (e.g., where user device 210 may not be capable of managing the input), as described below. In this way, implementations described herein may conserve computing resources of user device 210.

As further shown in FIG. 5, process 500 may include determining, based on the first information that identifies the input, a first response based on second information (block 520). For example, intelligence platform 220 may receive, from user device 210, the first information that identifies the input, and may determine a first response based on the second information.

In some implementations, the first response may include a first type of response. For example, different modules (e.g., alert generation module 424, question analysis module 430, recommendation module 435, etc.) of intelligence platform 220 may generate different types of responses that may correspond to particular types of inputs. As an example, assume that the input is a query. In this case, intelligence platform 220 (e.g., question analysis module 430) may determine a response that is of a particular type (e.g., an answer) based on the type of input. In some implementations, a type of response may include an answer, a recommendation, an alert, an action, or the like.

In some implementations, the second information may include information associated with a resource or a set of resources (e.g., a corpus of documents, a set of files, a set of web pages, or the like). For example, intelligence platform 220 may receive, from user device 210, external information source 230, and/or database device 240, the second information. Additionally, or alternatively, intelligence platform 220 may perform a technique (e.g., a web crawling technique, a web scraping technique, a web searching technique, a database searching technique, a data mining technique, a database searching technique, or the like), and may receive the second information based on the technique. Additionally, or alternatively, intelligence platform 220 may receive the second information, and may perform one or more processing techniques (e.g., natural language processing techniques, such as text standardization techniques, tokenization techniques, part-of-speech (POS) tagging techniques, or the like). In this way, intelligence platform 220 may process the second information more efficiently while generating responses to inputs than as compared to situations where intelligence platform 220 did not perform the processing techniques, thereby conserving processor and/or memory resources of intelligence platform 220.

In some implementations, the second information may be associated with a project. As used herein, a project includes a collaborative endeavor in which one or more users (e.g., associated with one or more user devices 210 and/or one or more virtual agent applications) may perform particular actions, generate particular information, modify particular information, etc. As an example, a project may include a software engineering project (e.g., associated with an application lifecycle management (ALM) process). In this case, the project may include multiple areas, such as requirements management, software architecture, computer programming, software testing, software maintenance, continuous integration, release management, etc.

In some implementations, the second information may be associated with one or more parameters. For example, a parameter may include a particular portion of the second information. As an example and continuing with the software engineering project example, a parameter may include an amount of tests (e.g., regression tests, or the like) that have been performed, particular test cases that have been executed in association with one or more tests, particular results of the test cases, or the like.

In some implementations, the second information may be associated with another virtual agent application that is executing on another user device 210 (e.g., a user device 210 that is different than the user device 210 associated with the input). For example, another user device 210 may receive information (e.g., feedback) based on an input from another user, and may provide the information to intelligence platform 220. In such cases, intelligence platform 220 may receive the information that identifies the input of the other user, may store the information, and/or may use the information when determining a response to an input from a user of user device 210.

In some implementations, intelligence platform 220 may determine the first response based on the second information, and/or the type of input received via the virtual agent application. Alternatively, intelligence platform 220 may determine the first response without having received information that identifies the input associated with the virtual agent application. For example, the first response may include an alert. In this case, intelligence platform 220 may monitor the second information (e.g., may monitor one or more parameters), may detect a condition, and/or may generate a response (e.g., an alert) based on the condition. As an example, assume that a threshold amount of test cases are associated with a particular result (e.g., a fail). In such cases, intelligence platform 220 may detect a condition (e.g., that an amount of failed test cases satisfies a threshold), and may determine an alert to provide to user device 210 (e.g., to notify a user of the status of the project).

In some implementations, intelligence platform 220 may provide, to user device 210, information that identifies the first response, and/or another response, as described elsewhere herein.

As further shown in FIG. 5, process 500 may include determining, based on the first information that identifies the input and/or the first response, a second response based on third information (block 530). For example, intelligence platform 220 may determine, based on the first information that identifies the input and/or based on the first response, a second response based on third information. In some implementations, intelligence platform 220 may determine the second response without user input. For example, intelligence platform 220 may automatically determine the second response based on determining the first response, based on the first information, or the like.

In some implementations, the second response may include a different type of response than as compared to the first response. For example, another module of intelligence platform 220 may determine the second response based on the first information that identifies the input and/or the first response (e.g., the first response that was determined by a different module). Alternatively, the second response may include a same type of response as the first response. Additionally, or alternatively, the third information may include information that is different than the second information (e.g., associated with a different source, associated with a different resource, associated with a different project, associated with another user device 210, or the like).

As an example, assume that the first information that identifies the input includes a query, and that the first response includes an answer to the query (e.g., as determined by question analysis module 430). In this case, the second response may include a recommendation (e.g., as determined by recommendation module 435). Additionally, continuing the example, assume that intelligence platform 220 determined the first response based on second information associated with a first project (e.g., a first software engineering project). In this case, intelligence platform 220 may determine the second response (e.g., a recommendation, such as a recommendation to execute particular test cases, or the like) based on third information associated with a second project (e.g., a previously completed software engineering project, a contemporaneous software engineering project, or the like). In this way, implementations described herein may conserve computing resources of user devices 210 (and/or other devices associated with a project) based on providing information that is associated with a known outcome and/or result (e.g., past projects).

As further shown in FIG. 5, process 500 may include providing, to the virtual agent application of the user device, fourth information based on the first response and/or the second response to permit and/or cause an action to be performed (block 540). For example, intelligence platform 220 may provide, to the virtual agent application of the user device, fourth information based on the first response and/or the second response to permit and/or cause an action to be performed.

In some implementations, intelligence platform 220 (e.g., messaging module 440) may aggregate responses (e.g., determined by other modules), and may provide information to the virtual agent application of user device 210 based on the responses. In some implementations, user device 210 may receive the information, and may provide the information for display (e.g., via a user interface). Additionally, or alternatively, user device 210 (e.g., TTS module 410) may receive the information, and may provide the information (e.g., may generate an audible output to be output via an output component). For example, intelligence platform 220 may provide the fourth information to permit and/or cause an action to be performed.

In some implementations, intelligence platform 220 may permit and/or cause another action to be performed. For example, intelligence platform 220 may cause a message (e.g., a push notification, an email message, a short message service (SMS) message, etc.) to be sent to user device 210 based on the fourth information. In this way, intelligence platform 220 may notify a user (e.g., a subject matter expert, a programmer, a developer, a tester, etc.) of the status of a particular project, may notify a particular user to perform an action (e.g., modify code, verify testing results, cause test cases to be executed, etc.).

In some implementations, intelligence platform 220 may cause the fourth information, and/or messages to be provided to other user devices 210 based on providing the fourth information to user device 210. In this way, other user devices 210 (e.g., other virtual agent applications) may receive the fourth information, and may cache the fourth information. Thereby, if other users provide similar inputs (e.g., queries) to respective virtual agent applications, then the respective virtual agent applications may determine a response based on the cached fourth information. In this way, intelligence platform 220 may reduce an amount of requests (e.g., for similar or the same information) that may be provided to intelligence platform 220, thereby conserving processor and/or memory resources of user devices 210, intelligence platform 220, and/or thereby conserving network resources.

In some implementations, intelligence platform 220 may cause an action to be performed in association with a project based on providing the fourth information. For example, assume that the fourth information includes particular recommendations (e.g., to orchestrate additional testing, to perform a debugging process, to analyze code associated with a potential defect, or the like). In such cases, user device 210 may provide the fourth information and may prompt the user for additional information regarding the recommendations (e.g., whether to perform actions associated with the recommendations). In some implementations, user device 210 may receive input identifying that the actions are to be performed, and may provide information that identifies the input to intelligence platform 220. In this way, intelligence platform 220 may perform the actions associated with the recommendations based on the input, thereby reducing a need of the user to individually cause particular actions to be performed, and thereby conserving processor and/or memory resources of computing devices associated with the project. Alternatively, intelligence platform 220 may perform the actions without having received an input (e.g., automatically).

In some implementations, intelligence platform 220 may permit a user to access text and/or a resource (e.g., second information and/or third information) associated with the fourth information. For example, intelligence platform 220 may provide information (e.g., for display via a user interface of user device 210) identifying and/or including particular second information and/or third information that was used to determine the fourth information. In some implementations, intelligence platform 220 may provide information that identifies a particular section of a document that includes the fourth information (e.g., and/or that was used to determine the fourth information). In this way, intelligence platform 220 may assist a user in verifying the accuracy of the fourth information. Additionally, in this way, intelligence platform 220 may reduce a quantity of processing needed to perform a search for the fourth information, thereby conserving processor and/or memory resources of user device 210.

Figure 7A:
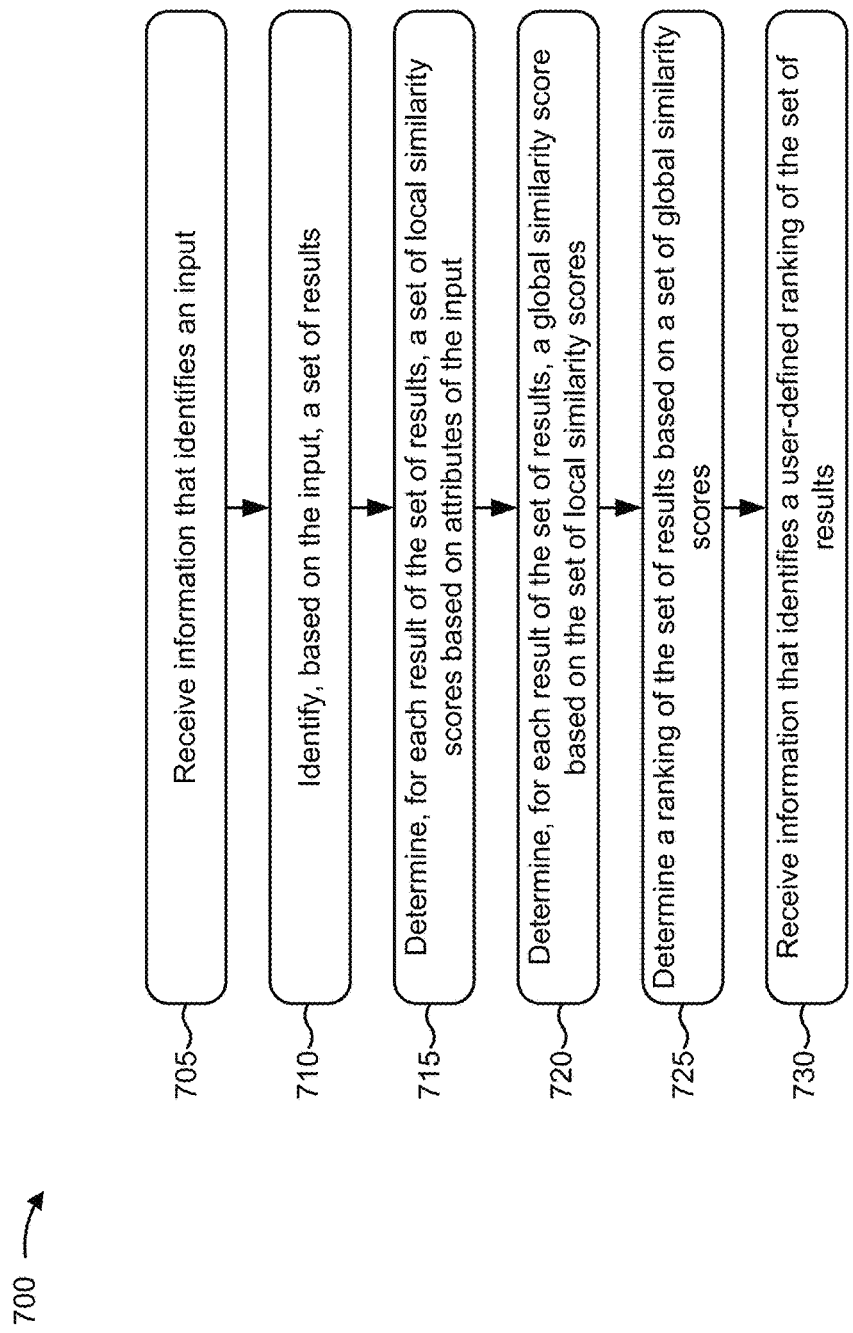
FIGS. 7A and 7B are flow charts of an example process for implementing a machine learning technique to improve information retrieval.
Figure 7B:
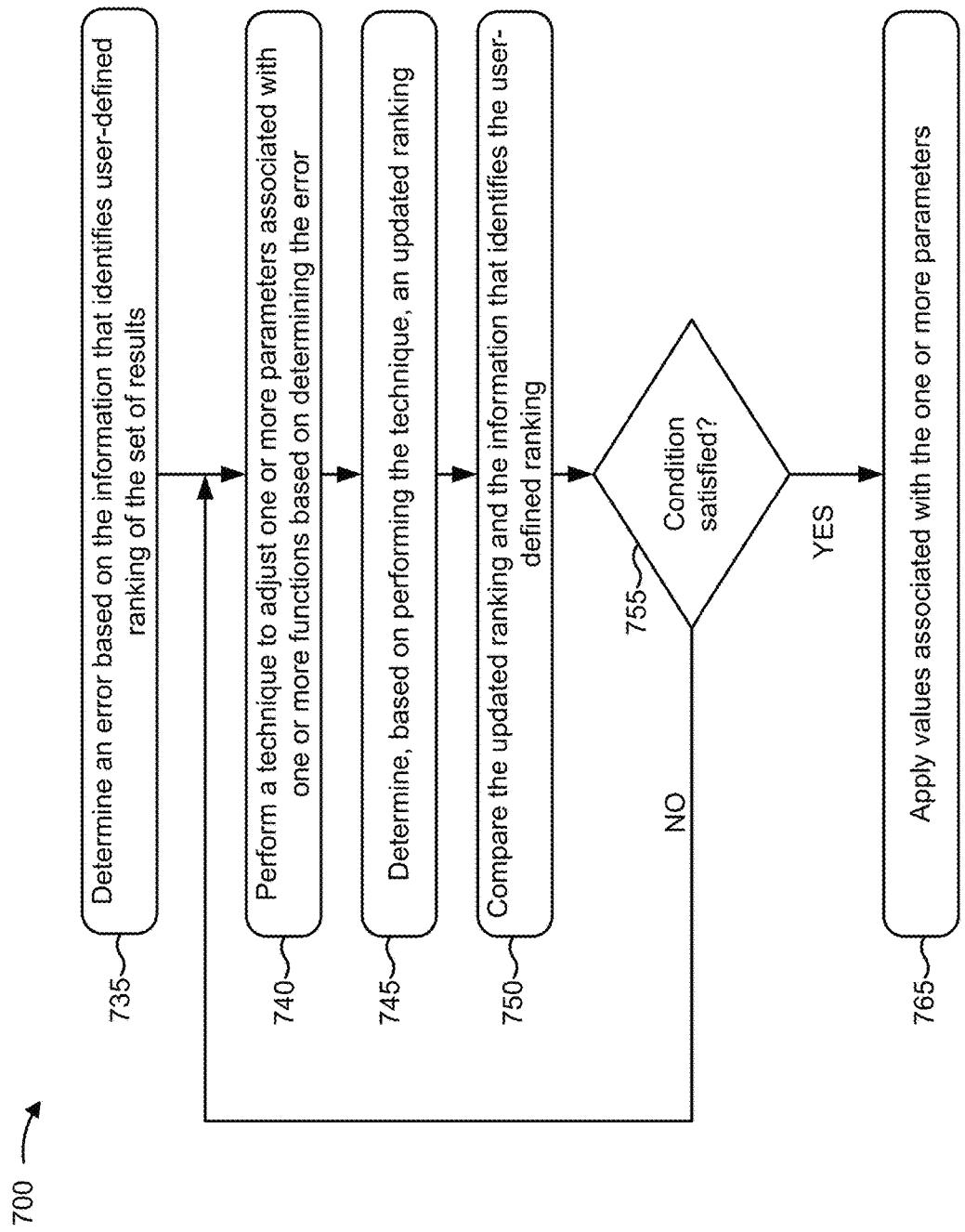

In some implementations, intelligence platform 220 may receive information (e.g., that identifies user-feedback) based on providing the fourth information, and may implement a technique based on the received information, as described in more detail in association with FIGS. 7A and 7B.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6E are diagrams of an example implementation 600 relating to example process 500 shown in FIG. 5. FIGS. 6A-6E show an example of providing multiple types of responses to a virtual agent application based on an input.

Figure 6A:
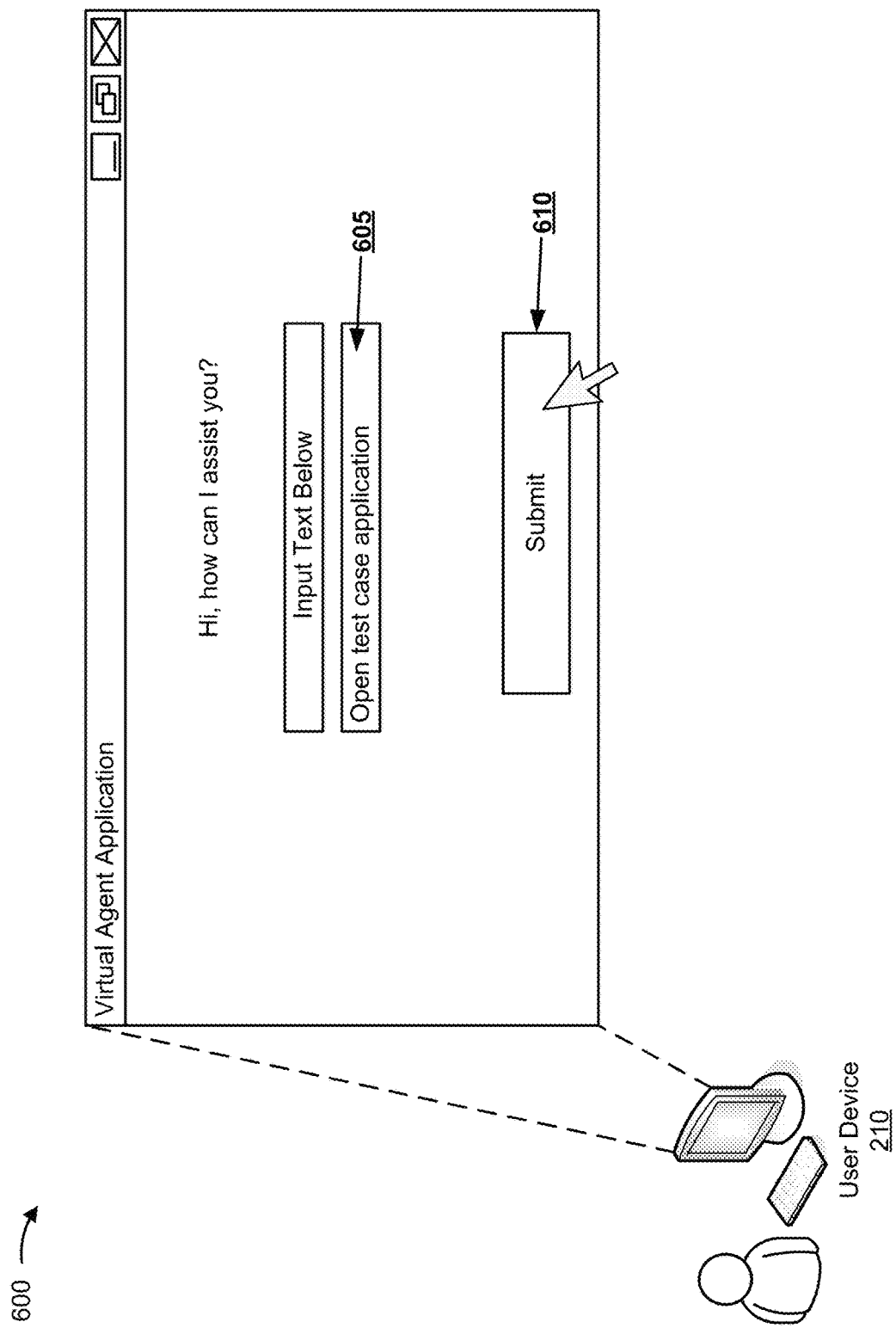
FIGS. 6A-6E are diagrams of an example implementation relating to the example process shown in FIG. 5.

As shown in FIG. 6A, and by reference number 605, a user may input a command (e.g., "Open test case application") by inputting text in association with a virtual agent application that is being executed by user device 210. As shown by reference number 610, the user may interact with the virtual agent application to submit the command. As an example, assume that the user is associated with a software engineering project (e.g., associated with an application life cycle management process).

Figure 6B:
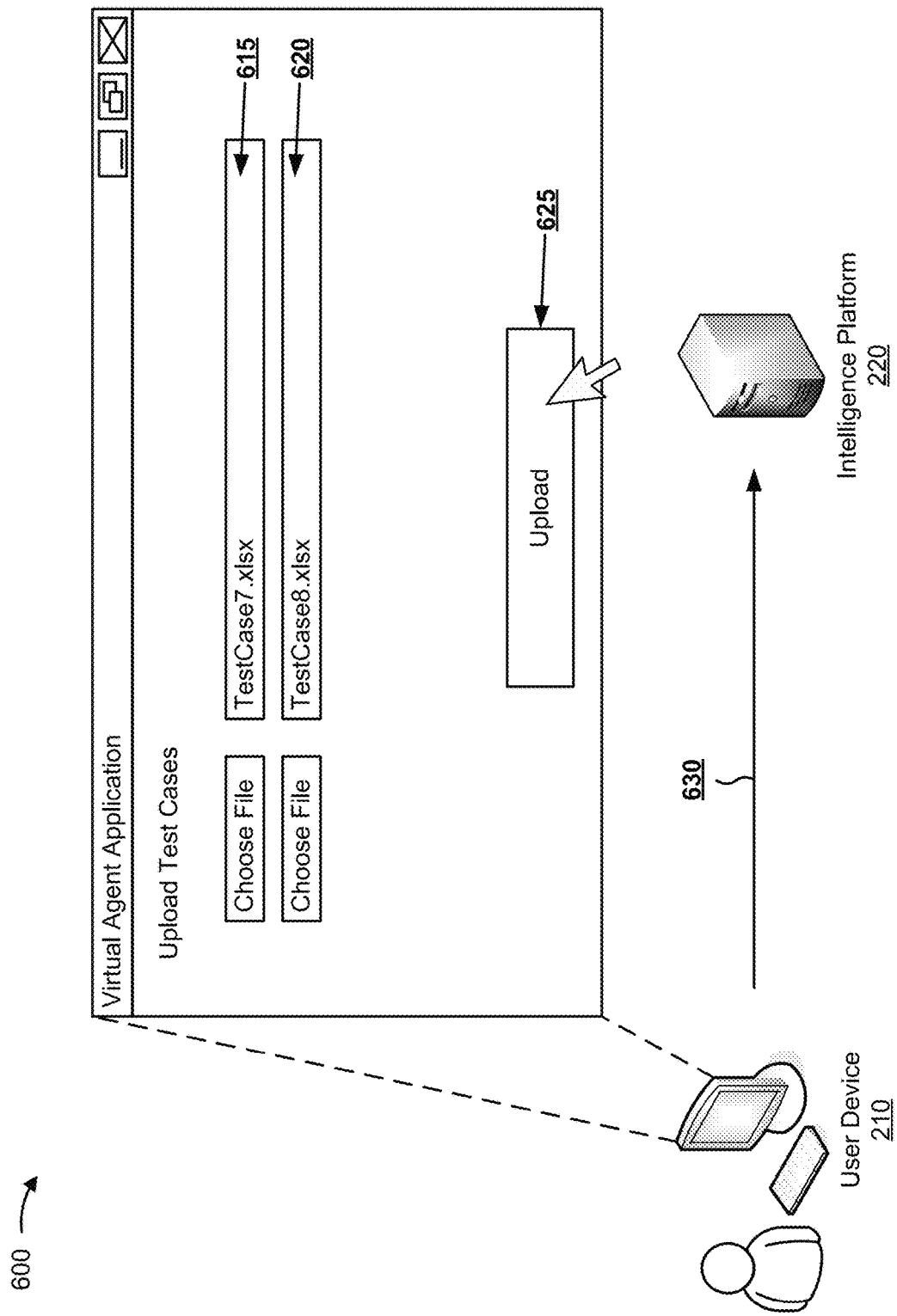

As shown in FIG. 6B, user device 210 may provide a particular user interface for display (e.g., associated with a test case application), that may enable the user to input particular information (e.g., files associated with test cases). For example, as shown by reference numbers 615 and 620, the user may select particular files (e.g., "TestCase7.xlsx" and "TestCase8.xlsx," respectively) to provide to intelligence platform 220. As shown by reference number 625, a user may interact with an "upload" button, and as shown by reference number 630, user device 210 may provide the particular information (e.g., the files associated with the test cases) to intelligence platform 220.

Figure 6C:
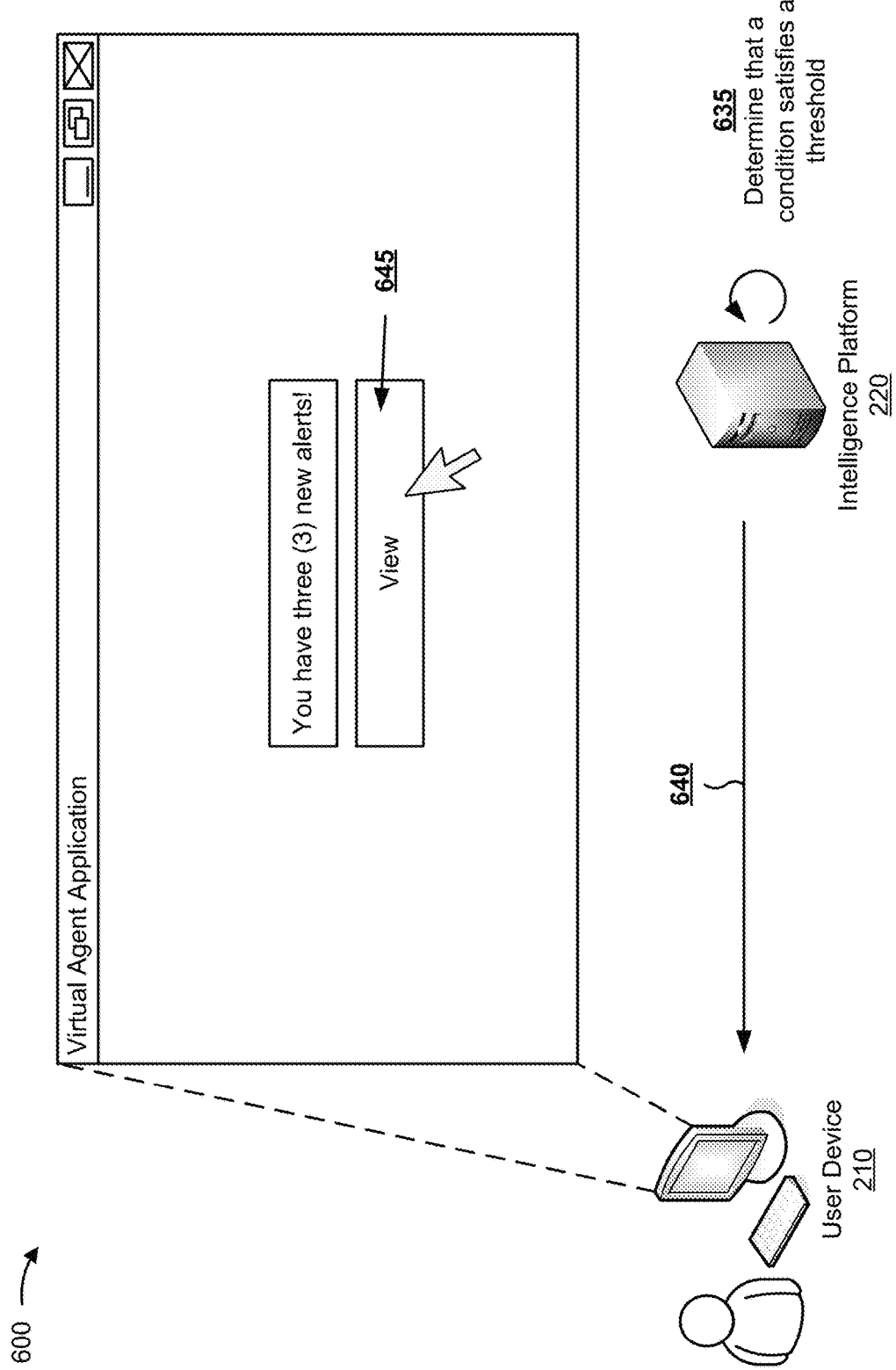

As shown in FIG. 6C, and by reference number 635, intelligence platform 220 may determine that a condition satisfies a threshold. As an example, assume that intelligence platform 220 determines that an amount of test cases are associated with a particular result (e.g., failures). For example, assume that a particular device executed test case 7 and test case 8, and that the test cases are associated with failures. Additionally, assume that intelligence platform 220 received information that identifies that the test cases are associated with failures. In this case, intelligence platform 220 may determine one or more alerts to be provided to user device 210. As shown by reference number 640, intelligence platform 220 may provide information that identifies the condition. As shown by reference number 645, user device 210 may provide information, for display via a user interface, that identifies that alerts may be available, and may receive information that identifies a user interaction with the user interface (e.g., a selection of a "view" button).

Figure 6D:
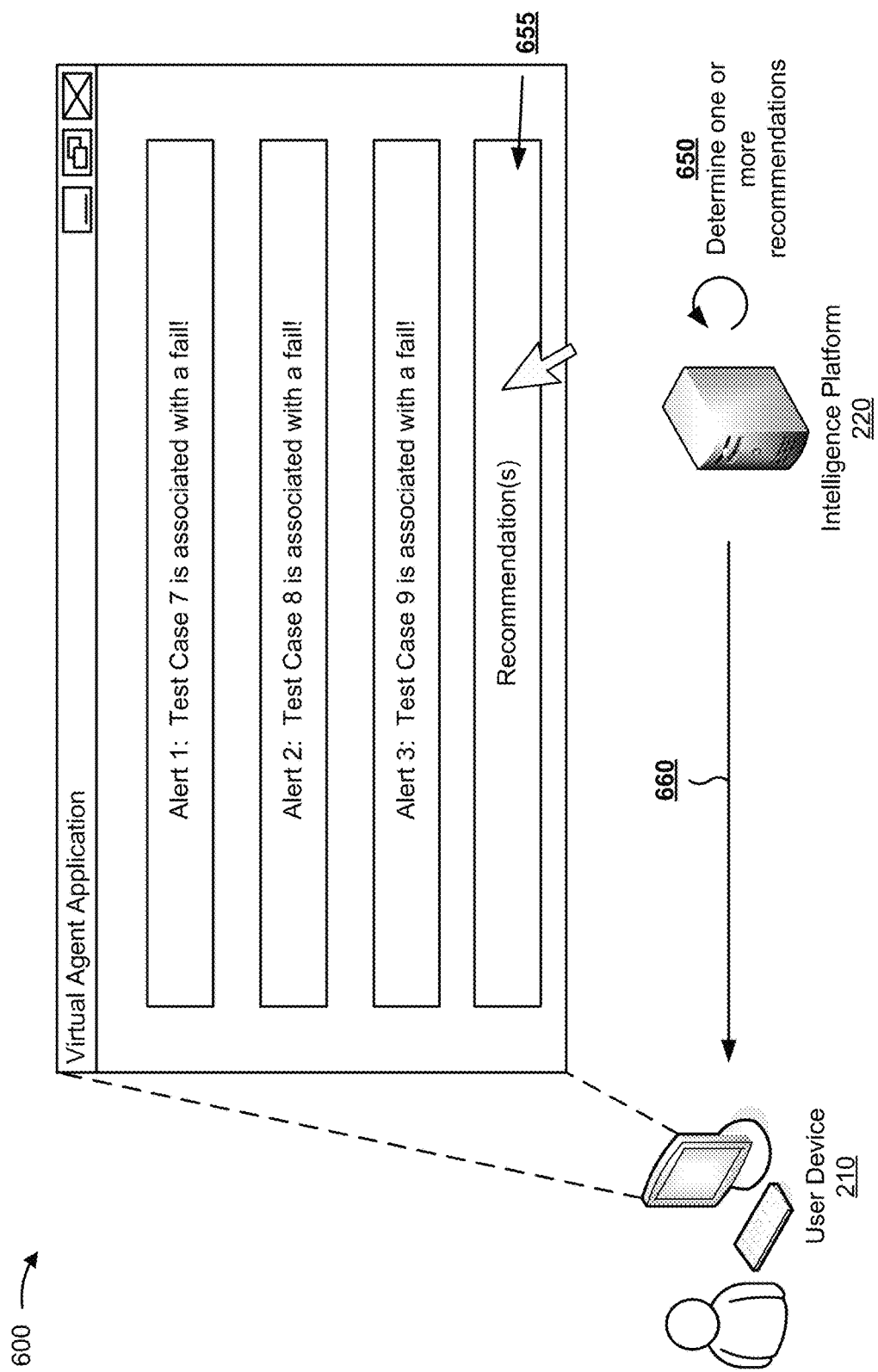

As shown in FIG. 6D, user device 210 may provide information, for display via a user interface, that identifies the alerts. For example, as shown, user device 210 may provide information, for display, that identifies the particular test cases that are associated with failures. As shown by reference number 650, intelligence platform 220 may determine one or more recommendations based on information associated with other software engineering projects. As an example, assume that particular actions were performed in association with other software engineering projects (e.g., previous iterations of regression testing, other ALM projects, or the like). In this case, intelligence platform 220 may identify the particular actions that were performed, and may determine recommendations based on the particular actions. As shown by reference number 655, a user may interact with a particular button (e.g., "Recommendation(s)"). As shown by reference number 660, intelligence platform 220 may provide information to user device 210 based on the user interaction.

Figure 6E:
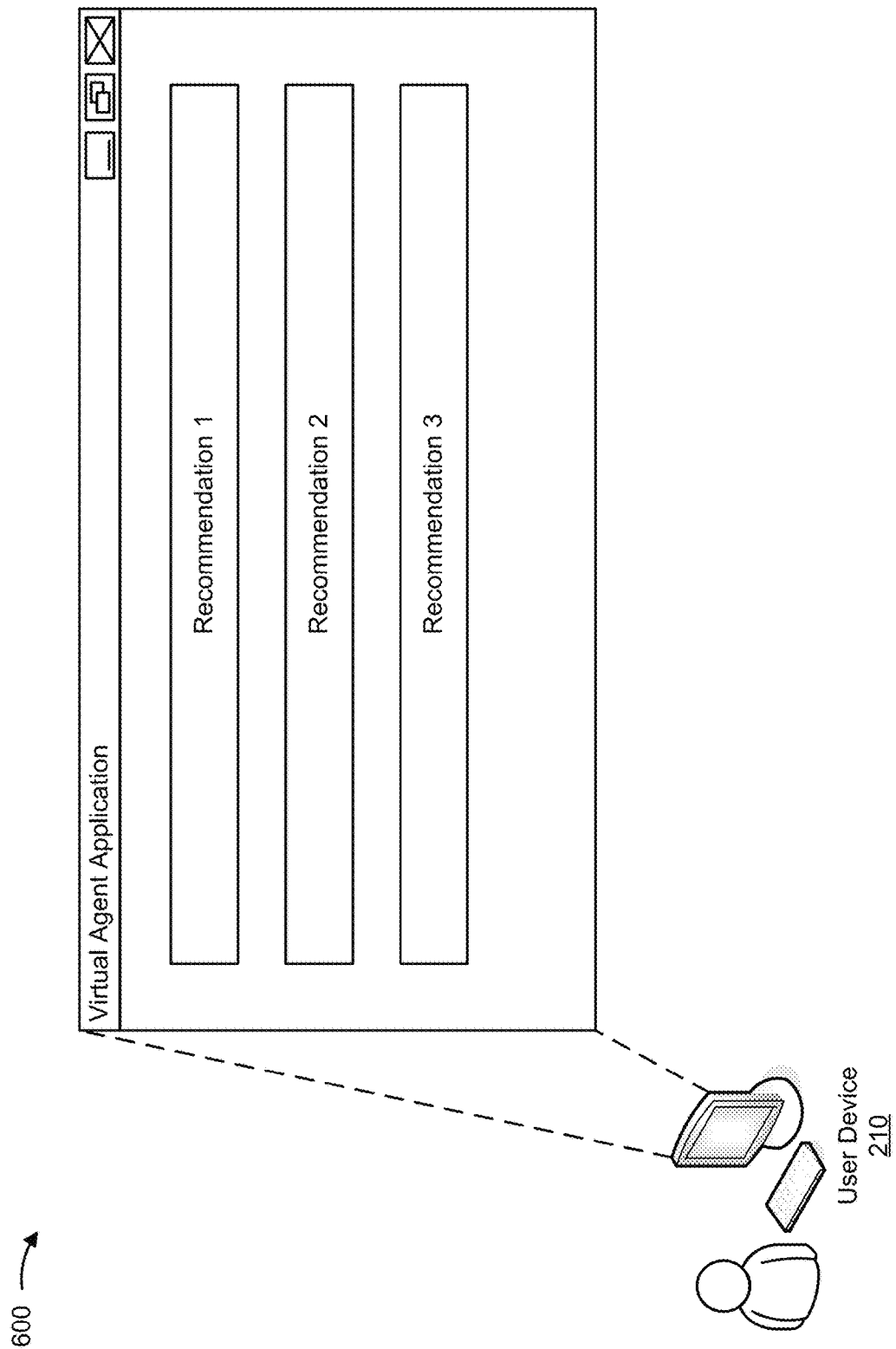

As shown in FIG. 6E, user device 210 may provide, for display, information that identifies the recommendations (e.g., "Recommendation 1," "Recommendation 2," and "Recommendation 3"). In this way, the user may identify particular recommendations, and/or may cause actions associated with the recommendations to be performed.

As indicated above, FIGS. 6A-6E are provided merely as an example. Other examples are possible and may differ from what was described with regard to FIGS. 6A-6E.

FIGS. 7A and 7B are flow charts of an example process 700 for implementing a machine learning technique to improve information retrieval. In some implementations, one or more process blocks of FIGS. 7A and 7B may be performed by intelligence platform 220. In some implementations, one or more process blocks of FIGS. 7A and 7B may be performed by another device or a group of devices separate from or including intelligence platform 220, such as user device 210, external information source 230, and/or database device 240.

As shown in FIG. 7A, process 700 may include receiving information that identifies an input (block 705). For example, intelligence platform 220 may receive, from user device 210, information that identifies an input (e.g., a query). Additionally, or alternatively, user device 210 (e.g., a virtual agent application being executed by user device 210) may receive information that identifies the input, and may provide the information that identifies the input to intelligence platform 220. In some implementations, the input (e.g., the query) may include a set of attributes (e.g., $qa_1, qa_2, \ldots qa_n$).

As further shown in FIG. 7A, process 700 may include identifying, based on the input, a set of results (block 710). For example, intelligence platform 220 may identify, based on the input (e.g., the query), a set of results (e.g., $c_1, c_2, \ldots c_m$). For example, a result may include a potential result to be provided to user device 210 in response to the query. In some implementations, a result may include data (e.g., data stored by intelligence platform 220, external information source 230, and/or database device 240, such as a document, a case (e.g., where case based reasoning (CBR) is being employed), a test result, or the like).

In some implementations, a result may include a set of attributes (e.g., $ca_1, ca_2, \ldots ca_n$). Additionally, or alternatively, the set of attributes, associated with the result, may correspond to the set of attributes associated with the query. In some implementations, a result may include the same set of attributes as the query, a subset of attributes that correspond to the query, or the like. For example, a result may include each attribute that is associated with the query, more attributes than the query, or fewer attributes than the query.

As further shown in FIG. 7A, process 700 may include determining, for each result of the set of results, a set of local similarity scores based on attributes of the input (block 715). For example, intelligence platform 220 may determine, for each result of the set of results, a set of local similarity scores based on the set of attributes associated with the input (e.g., the query). In some implementations, a local similarity score may include information that identifies a measure of similarity between an attribute of a result and a corresponding attribute associated with the query.

In some implementations, for each result, intelligence platform 220 may determine a local similarity score for each attribute (e.g., $qa_1, qa_2, \ldots qa_n$) of the query. For example, intelligence platform 220 may determine a local similarity score using the following expression:

$$ls_i = f_i(qa_i, ca_i, \text{theta}_i)$$

For example, in the above expression, $ls_i$ may represent the local similarity score between an attribute of the query (e.g., $qa_i$) and a corresponding attribute of a result (e.g., $ca_i$). Additionally, or alternatively, $\text{theta}_i$ may represent a parameter of a function (e.g., $f_i$) used to generate the local similarity score.

In some implementations, the function (e.g., $f_i$) may include a Gaussian function, a feedforward neural network function, or the like, and/or may be characterized by a set of parameters (e.g, $\text{theta}_i$). As a particular example, the function used to determine local similarity scores may be represented as the Gaussian function:

$$f_i = ae^{-\frac{((m-d)^2)}{2((sigma)^2}}$$

For example, as shown in the above expression, "m" may represent the mean of the Gaussian function, and "sigma" may represent the standard deviation of the Gaussian function. Additionally, or alternatively, "m" and "sigma" may represent the adjustable parameters (e.g., theta) of the Gaussian function. In some implementations, intelligence platform 220 may set "m" to the value zero, thereby rendering "sigma" as the sole adjustable parameter of $f_i$. While a particular example of a function $f_i$ and adjustable parameters theta are described above, it should be understood that other implementations include other types of functions and/or other types of adjustable parameters.

In some implementations, intelligence platform 220 may determine a set of local similarity scores based on the amount of attributes associated with the query. As an example, assume that the query includes eight attributes (e.g., $qa_1, qa_2, \ldots qa_8$). In this case, intelligence platform 220 may determine eight local similarity scores associated with the query and a particular result (e.g., $ls_1, ls_2, \ldots ls_8$).

As further shown in FIG. 7A, process 700 may include determining, for each result of the set of results, a global similarity score based on the set of local similarity scores (block 720). For example, intelligence platform 220 may determine, for each result (e.g., $c_1, c_2, \ldots c_m$), a global similarity score (e.g., $gs_1, gs_2, \ldots gs_m$) based on the respective set of local similarity scores for the results. For example, intelligence platform 220 may determine a global similarity score, for a result, using the following expression:

$$gs = g(ls_1, ls_2, \ldots ls_n, w_1, w_2, \ldots w_n)$$

For example, in the above expression, g may represent a function used to generate a global similarity score (e.g., gs) based on local similarity scores (e.g., ($ls_1, ls_2, \ldots ls_n$) and weight values (e.g., $w_1, w_2, \ldots w_n$) to be applied to respective local similarity scores. For example, a weight value may affect a particular importance of an attribute as compared to other attributes. In other words, a particular attribute of the result may be of more importance when determining similarity to the query than another attribute. In some implementations (e.g., where g is a linear function), the expression for determining the global similarity score may be represented as:

$$gs = w_1 * ls_1 + w_2 * ls_2 \ldots + w_n * ls_n$$

In some implementations, intelligence platform 220 may determine a set of global similarity scores (e.g., a global similarity score for each result), and may rank the results based on the respective global similarity scores, as described below. For example, intelligence platform 220 may determine a global similarity score, of the set of global similarity scores, based on a linear weighted sum of the local similarity scores.

As further shown in FIG. 7A, process 700 may include determining a ranking of the set of results based on a set of global similarity scores (block 725). For example, intelligence platform 220 may rank each result, of the set of results, based on respective global similarity scores, and may determine a ranking based on respective ranks. In some implementations, intelligence platform 220 may determine a ranking that includes results in ascending order, descending order, etc. based on the global similarity scores. Additionally, or alternatively, intelligence platform 220 may determine a ranking that includes a particular subset of results (e.g., results associated with the top ten global similarity scores, associated with the top three global similarity scores, results associated with global similarity scores that satisfy a threshold, etc.). In this way, implementations described herein may conserve computing resources and/or network resources (e.g., based on providing a subset of results, and/or results that may be of particular similarity). In some implementations, intelligence platform 220 may provide, to user device 210, information that identifies the ranking. For example, intelligence platform 220 may provide a list of results based on the ranking (e.g., results of the query). In some implementations, user device 210 may provide, for display, the information that identifies the ranking.

As further shown in FIG. 7A, process 700 may include receiving information that identifies a user-defined ranking of the set of results (block 730). For example, intelligence platform 220 may receive, from user device 210, information that identifies a user-defined ranking of the set of results. In some implementations, the ranking (e.g., ranked by intelligence platform 220) of the set of results may include a ranked list (e.g., $rr_1, rr_2, \ldots rr_L$). For example, $rr_1$ may represent the highest ranked result (e.g., as determined by intelligence platform 220), $rr_2$ may represent the second highest ranked result, etc. In some implementations, the information that identifies the user-defined ranking of the set of results may include a user-defined list (e.g., $ur_1, ur_2, \ldots ur_L$). For example, $ur_1$ may represent the highest ranked result (e.g., as ranked by a user), $ur_2$ may represent the second highest ranked result, etc.

In some implementations, user device 210 may receive, based on an input, information that identifies the user-defined ranking of the set of results, and may provide the information to intelligence platform 220. In this way, intelligence platform 220 may compare the ranking of the set of results (e.g., ranked by intelligence platform 220) and the user-defined ranking, and may determine an error, as described below.

As further shown in FIG. 7B, process 700 may include determining an error based on the information that identifies the user-defined ranking of the set of results (block 735). For example, intelligence platform 220 may determine an error based on comparing the ranking of the set of results and the user-defined ranking of the set of results. As an example, assume that the ranking of the set of results includes a particular ranking (e.g., $rr_1 = c_1$, $rr_2 = c_2$, and $rr_3 = c_3$). Additionally, assume that the user-defined ranking includes another ranking (e.g., $ur_1 = c_2$, $ur_2 = c_1$, and $ur_3 = c_3$). In this case, intelligence platform 220 may determine an error based on a discrepancy between the ranking and the user-defined ranking (e.g., $c_1$ and $c_2$ include different ranks).

As further shown in FIG. 7B, process 700 may include performing a technique to adjust one or more parameters associated with one or more functions based on determining the error (block 740). For example, intelligence platform 220 may perform a technique to adjust one or more parameters associated with a local similarity score function and/or a global similarity score function based on determining the error. In some implementations, intelligence platform 220 may perform the technique based on implementing a gradient descent technique (e.g., a gradient descent algorithm). For example, a gradient descent technique may be used to determine parameter values, of a function, that may generate a minimum value associated with the function (e.g., parameter values that may generate a minimum value associated with an error function (er)), as described below.

In some implementations, intelligence platform 220 may perform the technique by determining an error function associated with a set of results. For example, intelligence platform 220 may determine an error function that is associated with a first ranked result (e.g., $rr_i$) and a second ranked result (e.g., $rr_j$). For example, intelligence platform 220 may determine a composite error function $er_{i,j}$ (e.g., a composite error function of a function $e1_{i,j}$ and another function $e2_{i,j}$):

$$er_{i,j}=e(e1_{i,j},e2_{i,j})$$

In the above expression, $e1_{i,j}$ may represent a function of a difference between a global similarity score of $rr_1$ and $rr_2$ (e.g., $e1_{i,j}=e1(gs_i, gs_j)$). Additionally, $e2_{i,j}$ may represent a function of a difference between a rank of $rr_i$ and $rr_j$ (e.g., $e2_{i,j}=e2(rr_i, rr_j, ur_i, ur_j)$).

In some implementations, the composite error function may be represented as:

$$er_{i,j}=[(gs_i-gs_j)^{beta1}]*[(rr_i-rr_j)^{beta2}]$$

In the above expression, beta1 and beta2 may represent parameters including values greater than or equal to one. Additionally, or alternatively, $(gs_i-gs_j)$ may identify a difference between global similarity scores of $rr_i$ and $rr_j$, and $(rr_i-rr_j)$ may represent a difference between ranks of $rr_i$ and $rr_j$.

In some implementations, intelligence platform 220 may identify particular pairs of results that include a ranking (e.g., as determined by intelligence platform 20) that does not match a user-defined ranking. For example, intelligence platform 220 may identify a pair of results where a value of a difference in rankings (e.g., $rr_i-rr_j$) does not match another value of a difference in user-defined rankings (e.g., $ur_i-ur_j$). In such cases, intelligence platform 220 may perform a gradient descent technique to identify parameter values that yields a minimum of a composite error function associated with the pair of results.

In some implementations, intelligence platform 220 may determine one or more updated weight values (e.g., $w_i'$) based on a gradient descent technique. For example, intelligence platform 220 may determine an updated weight value based on the following expression:

$$w_i'=w_i-(alpha_w * \text{gradient of } er_{i,j})$$

For example, in the above expression, $w_i'$ represents an updated weight value (e.g., to be used to determine an updated global similarity score), $w_i$ represents a weight value (e.g., that was used to determine a global similarity score), $alpha_w$ represents a learning rate parameter, and the gradient of $er_{i,j}$ represents the derivative of the composite error function with respect to the weight value (e.g., $w_i$). In some implementations, a learning rate parameter may include a value that affects the amount by which a parameter value (e.g., a weight value) may change with each iteration of the gradient descent algorithm, thereby affecting a rate at which the gradient descent algorithm may determine a minimum value of the composite error function.

Additionally, or alternatively, intelligence platform 220 may determine one or more updated theta values (e.g., $theta_i'$) based on a gradient descent technique. For example, intelligence platform 220 may determine an updated theta value based on the following expression:

$$theta_i'=theta_i-(alpha_{theta} * \text{gradient of } er_{i,j})$$

For example, in the above expression, $theta_i'$ represents an updated theta value (e.g., to be used to determine an updated local similarity score), $theta_i$ represents a theta value (e.g., that was used to determine a local similarity score), $alpha_{theta}$ represents a learning rate parameter, and the gradient of $er_{i,j}$ represents the derivative of the composite error function with respect to the theta value (e.g., $theta_i$).

In this way, intelligence platform 220 may identify a gradient of the composite error function, and may perform iterations (e.g., calculate updated parameter values, such as w and/or theta) proportional to the negative of the respective gradients (e.g., derivatives) such that intelligence platform 220 may determine parameter values that may yield a minimum of the composite error function. In some implementations, intelligence platform 220 may perform an iteration of the gradient descent technique, and may determine one or more updated weight values and/or theta values (e.g., to be used to determine updated local similarity scores and/or global similarity scores, as described below). While implementations are described using a gradient descent technique, other implementations may use other techniques, such as a conjugate gradient technique, a stochastic gradient descent technique, a nelder-mead technique, a downhill simplex technique, or the like.

As further shown in FIG. 7B, process 700 may include determining, based on performing the technique, an updated ranking (block 745). For example, intelligence platform 220 may determine an updated set of local similarity scores, an updated set of global similarity scores, and an updated ranking of the set of results based on the updated parameter values (e.g., in a similar manner as described above in connection with blocks 715, 720, and 725, respectively).

As further shown in FIG. 7B, process 700 may include comparing the updated ranking and the information that identifies the user-defined ranking (block 750), and determining whether a condition is satisfied (block 755). For example, intelligence platform 220 may compare the updated ranking and the information that identifies the user-defined ranking, and may determine whether a condition is satisfied (e.g., to determine whether to perform additional iterations of the gradient descent technique).

In some implementations, a condition may include an error. For example, intelligence platform 220 may determine whether an error exists (e.g., a ranking error as described above in connection with block 735), and may determine whether the condition is satisfied based on whether an error exists.

Additionally, or alternatively, a condition may include an amount of iterations of the technique (e.g., gradient descent technique). For example, intelligence platform 220 may determine whether intelligence platform 220 has performed a threshold amount of iterations of the gradient descent technique, and may determine whether the condition is satisfied based on the threshold amount of iterations.

Additionally, or alternatively, a condition may include a difference in values, of the composite error function, associated with successive iterations of the gradient descent technique. For example, intelligence platform 220 may determine a first value associated with the composite error function based on a first set of parameter values, and may determine a second value associated with the composite error function based on a second set of parameter values (e.g., updated parameter values), and may determine whether the second value satisfies a threshold, may determine whether a difference between the second value and the first value satisfies a threshold, or the like.

As further shown in FIG. 7B, if the condition is not satisfied (block 755—NO), then process 700 may include returning to block 740. For example, intelligence platform 220 may perform another iteration of the technique (e.g., the gradient descent technique), may determine an updated ranking, may compare the updated ranking and the information that identifies the user-defined ranking, and may determine whether the condition is satisfied. In some implementations, intelligence platform 220 may determine that the condition is not satisfied based on determining a ranking error, determining that the amount of iterations of the gradient descent technique does not satisfy the threshold, determining that a value of the composite error function does not satisfy a threshold, and/or determining that a difference in values of the composite error function between successive iterations of the gradient descent technique does not satisfy a threshold.

As further shown in FIG. 7B, if the condition is satisfied (block 755—YES), then process 700 may include applying values associated with the one or more parameters (block 765). For example, intelligence platform 220 may store information that identifies the parameter values (e.g., weight values and/or theta values), and may apply the parameter values in association with other queries. That is, intelligence platform 220 may receive additional queries, and may determine rankings of results based on the parameter values.

In this way, intelligence platform 220 may receive information that identifies a user-defined ranking of results (e.g., a user-desired ranking of results), and may determine parameter values that may generate rankings of results that more accurately match the user-defined ranking. In this way, implementations described herein may enable intelligence platform 220 to provide results to queries that more accurately reflect user-desired results, thereby reducing a quantity of additional queries for other results, or the like. In this way, implementations described herein may conserve processor and/or memory resources of user devices 210 and/or intelligence platform 220, and/or may conserve network resources.

Additionally, in this way, implementations described herein improve the accuracy and quality of information retrieval, thereby increasing user satisfaction regarding intelligence platform 220, reducing the need of the user to cause additional searches to be performed, etc. In this way, intelligence platform 220 may more quickly and accurately provide results that adapt to the preference of the user.

Although FIGS. 7A and 7B shows example blocks of process 700, in some implementations, process 700 may include additional blocks, fewer blocks, different blocks, or differently arranged blocks than those depicted in FIGS. 7A and 7B. Additionally, or alternatively, two or more of the blocks of process 700 may be performed in parallel.

Figure 8A:
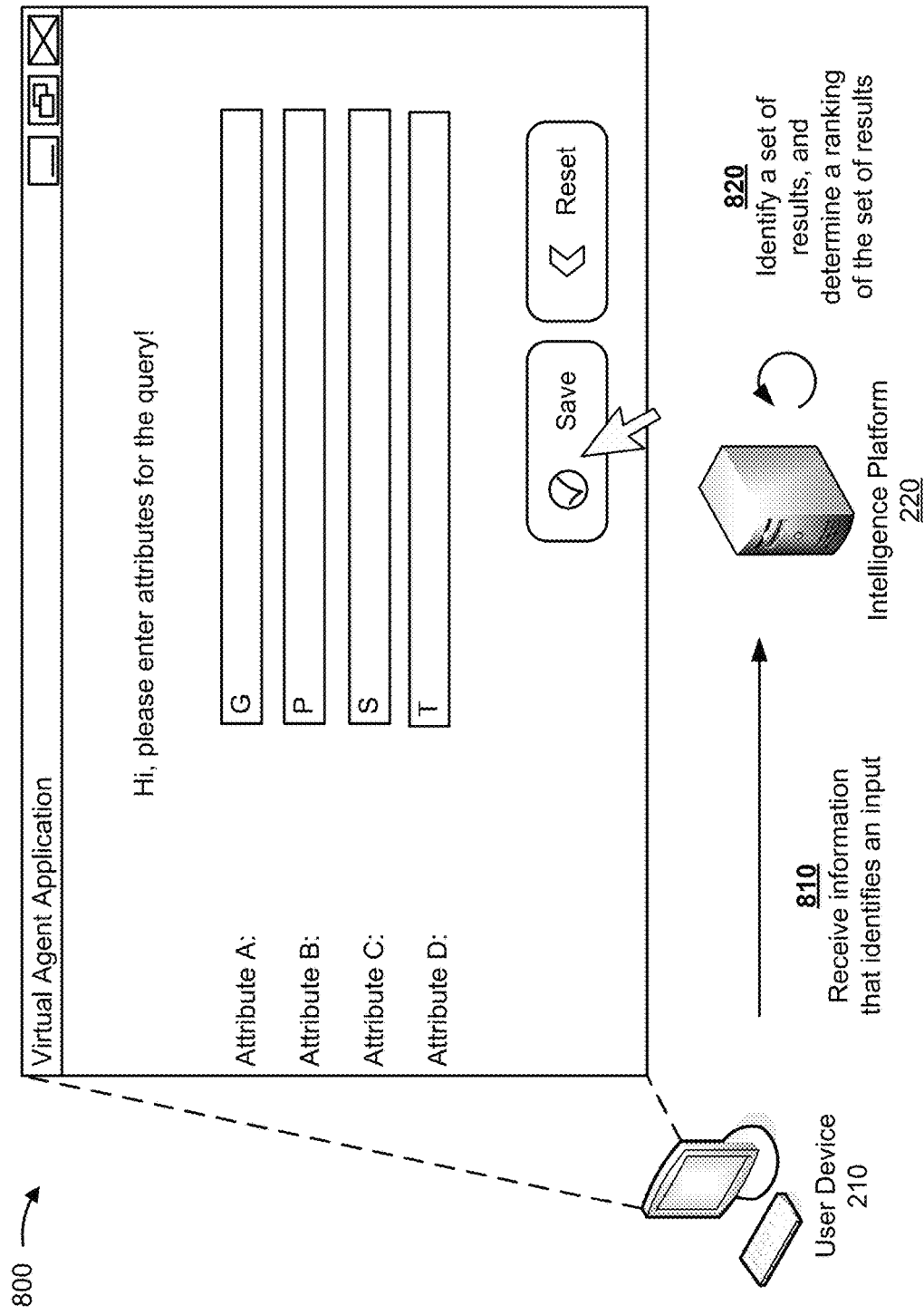
FIGS. 8A-8C are diagrams of an example implementation relating to the example process shown in FIGS. 7A and 7B.
Figure 8B:
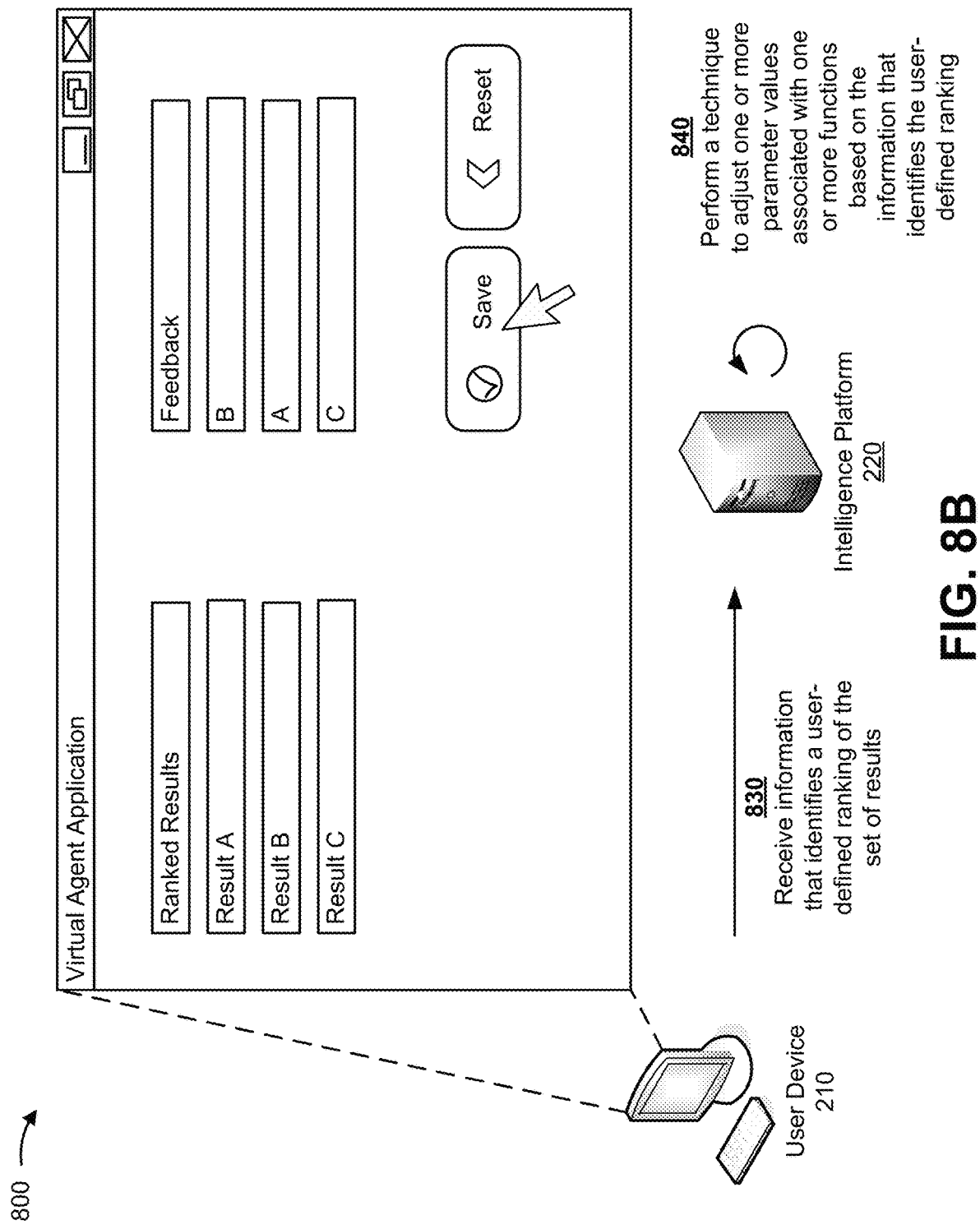
Figure 8C:
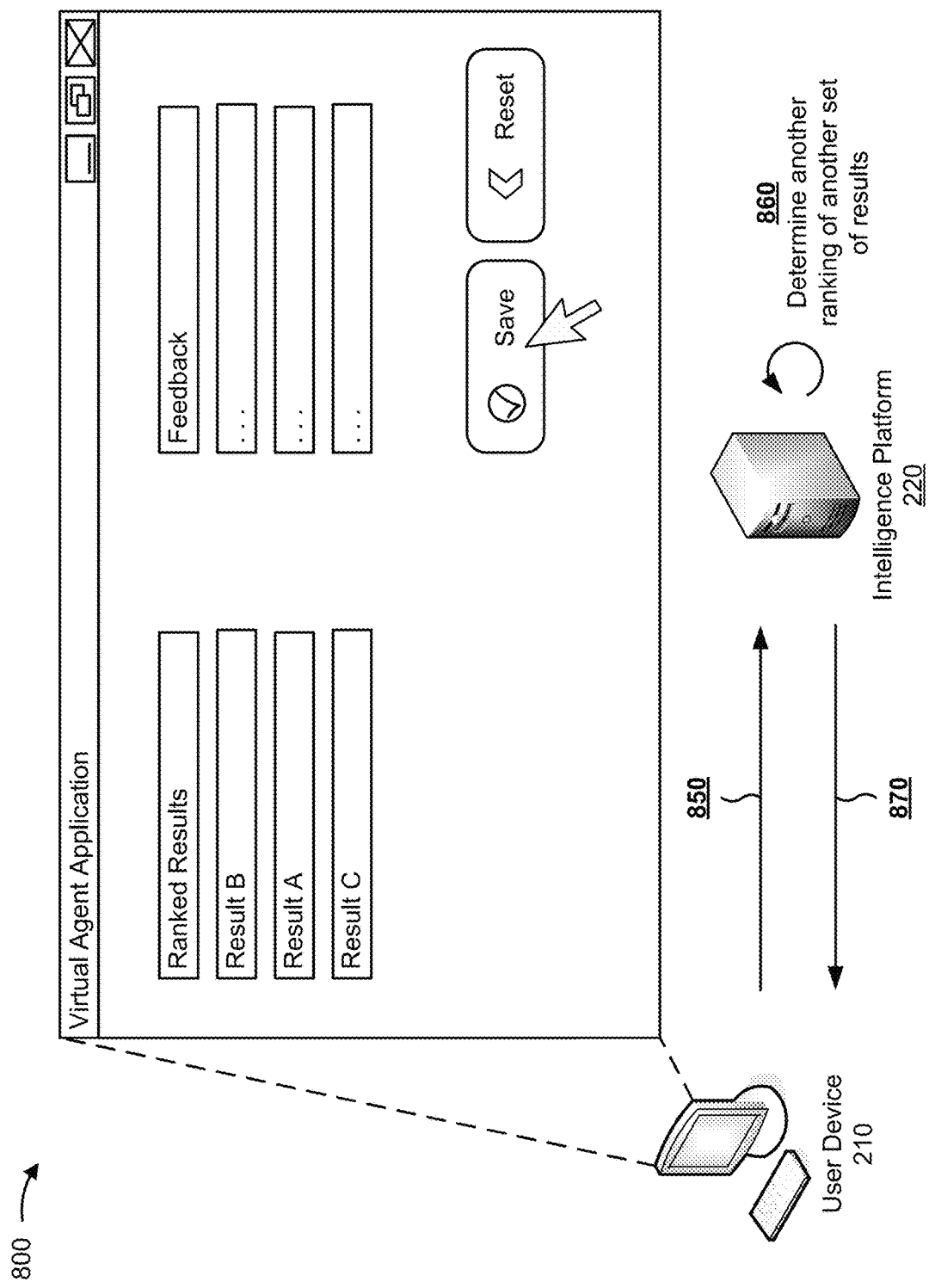

FIGS. 8A-8C are diagrams of an example implementation 800 relating to example process 700 shown in FIGS. 7A and 7B. FIGS. 8A-8C show an example of implementing a machine learning technique to improve information retrieval.

As shown in FIG. 8A, and by reference number 810, intelligence platform 220 may receive information that identifies an input. For example, assume that a user enters particular values that correspond to attributes, and/or that the user wishes to perform a search for information that includes the particular values associated with the attributes (e.g., a query). As shown by reference number 820, intelligence platform 220 may identify a set of results (e.g., based on stored information, based on querying external information source 230, or the like), may determine a ranking of the set of results (e.g., by determining local similarity scores and/or global similarity scores based on the attributes, as described above in connection with FIGS. 7A and 7B), and may provide information that identifies the ranking to user device 210.

As shown in FIG. 8B, user device 210 may provide, for display, information that identifies the ranking of the set of results. For example, assume that intelligence platform 220 determined a ranking of "Result A," "Result B," and then "Result C." In other words, intelligence platform 220 determined that "Result A" most closely matched the values associated with the attributes (e.g., provided by the user), etc. As shown by reference number 830, intelligence platform 220 may receive information that identifies a user-defined ranking of the set of results (e.g., "Feedback"). For example, as shown, assume that the user determined that "Result B" was more pertinent than "Result A" (e.g., more closely matched the values associated with the attributes). In this case, intelligence platform 220 may determine an error based on comparing the ranking of the set of results and the user-defined raking (e.g., the two sets of results do not match). As shown by reference number 840, intelligence platform 220 may perform a technique to adjust one or more parameter values associated with one or more functions based on the information that identifies the user-defined ranking. For example, intelligence platform 220 may perform a machine learning technique (e.g., a gradient descent technique) to adjust values associated with parameters to be used to determine local and/or global similarity scores, as described above in connection with FIGS. 7A and 7B.

As shown in FIG. 8C, and by reference number 850, intelligence platform 220 may receive information that identifies another query. As shown by reference number 860, intelligence platform 220 may determine another ranking of another set of results (e.g., based on the updated parameter values), and may provide, to user device 210, information that identifies the other ranking of the other set of results, as shown by reference number 870. User device 210 may provide, for display, information that identifies the other ranking of the set of results. As shown, assume that the user determines that the other ranking of the set of results is correct (e.g., does not provide any feedback).

In this way, intelligence platform 220 may determine additional rankings of results based on feedback received from user device 210. Additionally, in this way, intelligence platform 220 may improve accuracy of information retrieval, thereby reducing an amount of additional searches for information, etc. In this way, intelligence platform 220 may conserve processor and/or memory resources, and/or may conserve network resources.

As indicated above, FIGS. 8A-8C are provided merely as an example. Other examples are possible and may differ from what was described with regard to FIGS. 8A-8C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device relating to software development, comprising:
a memory; and
one or more processors to:
  receive first information that identifies an input associated with a first virtual agent application executing on a user device,
    the first virtual agent application providing an interface for a project involving a plurality of user devices,
      the project including the first virtual agent application and a second virtual agent application, and
    the first information including a query regarding execution of software test cases;
  determine, based on the first information that identifies the input, a first response including second information,
    the second information being associated with a first resource,
    the second information identifying first particular software test cases and execution statuses of the first particular software test cases,
    the second information being associated with the second virtual agent application, and
    the first particular software test cases being associated with a particular current regression test iteration of the project;
  identify third information, associated with one or more other projects or other regression test iterations of the project, based on the execution statuses of the first particular software test cases,
    the one or more other projects including a contemporaneous project, and
    the third information being associated with a second resource that is different than the first resource;
  determine, based on the first information that identifies the input, the first response, and the third information, and without user input, a second response including a recommendation to execute second particular software test cases,
    the second particular software test cases being associated with the particular current regression test iteration of the project,
    the second response including a same type of response as the first response, and
    the second response including a same type of response as the first response; and
  provide, to the first virtual agent application, fourth information that identifies at least one of the first response or the second response.

2. The device of claim 1, where the one or more processors are further to:
identify a set of results based on the fourth information;
determine a first ranking of the set of results;
receive, from the user device, fifth information that identifies a user-defined ranking of the set of results;
perform, based on the fifth information and the set of results, a technique to adjust one or more parameters associated with one or more of a local similarity score function or a global similarity score function,
  the local similarity score function being configured to produce a local similarity score,
    the local similarity score including information that identifies a measure of similarity between an attribute associated with a result, of the set of results, and a corresponding attribute associated with the query, and
  the global similarity score function being configured to produce a global similarity score,
    the global similarity score being based on a set of local similarity scores;
determine a second ranking based on performing the technique;
determine that a condition is satisfied based on comparing the user-defined ranking and the second ranking; and
apply one or more values associated with the one or more parameters based on the condition being satisfied,
  the device to use the one or more values in association with one or more additional inputs received after the input.

3. The device of claim 1, where the one or more processors are further to:
receive fifth information that identifies feedback based on providing the fourth information;

implement a machine learning technique based on the fifth information; and provide, to the user device, sixth information based on performing the machine learning technique.

4. The device of claim 1, where the user device is a first user device, and where the second virtual agent application is associated with a second user device, the second virtual agent application being different from the first virtual agent application, and the second user device being different from the first user device.

5. The device of claim 1, where the user device is a first user device, and where the one or more processors are further to:

provide the fourth information to the second virtual agent application of a second user device, the second virtual agent application being different from the first virtual agent application, and the second user device being different from the first user device.

6. The device of claim 1, where the one or more processors, when providing the fourth information, are to at least one of:

provide, for display on the user device via a user interface, the fourth information;

provide the fourth information to cause the user device to generate an audible output of the fourth information; or provide the fourth information to cause a message to be sent to the user device, the message including the fourth information.

7. The device of claim 1, where the one or more processors are further to:

identify a set of results based on the fourth information;

determine a first ranking of the set of results;

receive, from the user device, fifth information that identifies a user-defined ranking of the set of results; and perform, based on the fifth information and the set of results, a technique to adjust one or more parameters associated with a global similarity score function, the global similarity score function being configured to produce a global similarity score, the global similarity score being based on a linear weighted sum of local similarity scores.

8. A method relating to software development, comprising:

receiving, by a device, first information that identifies an input associated with a first virtual agent application executing on a user device, the first virtual agent application providing an interface for a project involving a plurality of user devices, the project including the first virtual agent application and a second virtual agent application, and the first information including a query regarding execution of software test cases;

determining, by the device and based on the input, a first response identifying first particular software test cases and execution statuses of the first particular software test cases, the first particular software test cases being associated with a particular current regression test iteration of the project;

identifying, by the device, second information, associated with other projects or other regression test iterations of the project, based on the execution statuses, the second information being associated with the second virtual agent application, and the other projects including:

a contemporaneous project, and a previously completed project;

determining, by the device, based on the first information, the first response, the second information, and without user input, a second response identifying a recommendation to execute second particular software test cases, the second particular software test cases being associated with the particular current regression test iteration of the project;

determining, by the device, a ranking of a set of results in the second response;

providing, by the device and to the user device, the ranking;

receiving, by the device and based on providing the ranking, a user-defined ranking of the set of results;

determining, by the device, an error based on comparing the ranking and the user-defined ranking;

performing, by the device and based on determining the error, a technique to adjust one or more parameters associated with one or more functions, the one or more functions being associated with the ranking; and applying, by the device, one or more values associated with the one or more parameters based on the technique, the device to determine additional rankings of additional sets of results based on applying the one or more values.

9. The method of claim 8, where the ranking is a first ranking;

where the method further comprises:

determining a second ranking of the set of results based on performing the technique;

comparing the user-defined ranking and the second ranking;

determining that a condition is satisfied based on comparing the user-defined ranking and the second ranking; and where applying the one or more values comprises:

applying the one or more values based on the condition being satisfied.

10. The method of claim 8, further comprising:

determining, for a first result of the set of results, a first set of local similarity scores based on one or more first attributes of the input and one or more second attributes of the first result;

determining, for a second result of the set of results, a second set of local similarity scores based on the one or more first attributes of the input and one or more third attributes of the second result;

determining a first global similarity score, for the first result, based on the first set of local similarity scores;

determining a second global similarity score, for the second result, based on the second set of local similarity scores; and where determining the ranking of the set of results comprises:

determining the ranking of the set of results based on the first global similarity score and the second global similarity score.

11. The method of claim 8, where the technique includes a gradient descent algorithm.

12. The method of claim 8, further comprising:

determining an error function based on the user-defined ranking and the ranking;

determining the one or more values associated with the one or more parameters based on a derivative of the error function; and where performing the technique comprises:
performing the technique based on determining the one or more values based on the derivative of the error function.

13. The method of claim 8, further comprising:
receiving fifth information that identifies another input, the fifth information being associated with another virtual agent application of another user device;
determining another set of results based on the fifth information and based on the one or more values associated with the one or more parameters; and
providing, to the other user device, sixth information that identifies the other set of results.

14. The method of claim 8, where the ranking is a first ranking;
where the method further comprises:
determining a second ranking of the set of results based on performing the technique;
comparing the user-defined ranking and the second ranking;
determining that a condition is not satisfied based on comparing the user-defined ranking and the second ranking; and
performing the technique to further adjust the one or more parameters.

15. A non-transitory computer-readable medium storing instructions, the instructions comprising:
one or more instructions that, when executed by one or more processors, cause the one or more processors to:
receive first information that identifies an input associated with a first virtual agent application of a user device,
the first virtual agent application providing an interface for a project involving a plurality of user devices,
the project including the first virtual agent application and a second virtual agent application, and
the first information including a query regarding execution of software test cases;
determine, based on the first information that identifies the input, a first response including second information,
the second information being associated with the second virtual agent application,
the second information being associated with a first resource, and
the second information identifying first particular software test cases and execution statuses of the first particular software test cases,
the first particular software test cases being associated with a particular current regression test iteration of the project;

identify third information, associated with one or more other projects or other regression test iterations of the project, based on the execution statuses,
the one or more other projects including a contemporaneous project;
determine, based on the first information that identifies the input, or the first response, and the third information, and without user input, a second response including a recommendation to execute second particular software test cases,
the second particular software test cases being associated with the particular current regression test iteration of the project, and the second response including a same type of response as the first response; and
provide, to the first virtual agent application, fourth information based on at least one of the first response or the second response,
the first virtual agent application to provide, via an output component of the user device, the fourth information.

16. The non-transitory computer-readable medium of claim 15, where the one or more instructions, when executed by the one or more processors, further cause the one or more processors to:
identify, based on the first information that identifies the input, a set of results;
determine a ranking of the set of results based on attributes of the first information and respective attributes of the set of results;
receive fifth information that identifies a modification to the set of results; and
implement a machine learning technique to adjust one or more parameter values of one or more functions based on the fifth information,
the device to use the one or more functions when determining additional rankings of additional sets of results.

17. The non-transitory computer-readable medium of claim 15, where the third information is associated with another virtual agent application that is executing on another user device.

18. The non-transitory computer-readable medium of claim 15,
where the recommendation is further based on a previously completed project.

19. The non-transitory computer-readable medium of claim 15, where the one or more instructions, when executed by the one or more processors, further cause the one or more processors to:
provide the fourth information to another virtual agent application associated with another user device.

20. The non-transitory computer-readable medium of claim 15, where the output component is at least one of an audio component or a display component.

* * * * *